(12) United States Patent
Yahiro et al.

(10) Patent No.: US 8,563,650 B2
(45) Date of Patent: Oct. 22, 2013

(54) METHOD FOR PRODUCING RESIN DISPERSIONS AND RESIN PARTICLES

(75) Inventors: Shuhei Yahiro, Kyoto (JP); Yoko Sakurai, Kyoto (JP); Yasuhiro Ono, Kyoto (JP)

(73) Assignee: Sanyo Chemical Industries, Ltd., Kyoto-shi (JP)

( * ) Notice: Subject to any disclaimer, the term of this patent is extended or adjusted under 35 U.S.C. 154(b) by 744 days.

(21) Appl. No.: 12/304,408

(22) PCT Filed: Jun. 13, 2007

(86) PCT No.: PCT/JP2007/000631
§ 371 (c)(1),
(2), (4) Date: Jun. 10, 2009

(87) PCT Pub. No.: WO2007/144984
PCT Pub. Date: Dec. 21, 2007

(65) Prior Publication Data
US 2009/0280423 A1 Nov. 12, 2009

(30) Foreign Application Priority Data

Jun. 14, 2006 (JP) ................................. 2006-165309
Dec. 6, 2006 (JP) ................................. 2006-329996

(51) Int. Cl.
*C08F 2/32* (2006.01)
(52) U.S. Cl.
USPC ........... 524/801; 528/271; 528/272; 528/274; 528/275; 528/277; 528/279
(58) Field of Classification Search
USPC ................. 523/206, 201; 524/284, 800, 801; 525/437; 528/271, 272, 274, 275, 277, 528/279
See application file for complete search history.

(56) References Cited

U.S. PATENT DOCUMENTS

| | | |
|---|---|---|
| 2003/0125479 A1 | 7/2003 | Kinsho et al. |
| 2004/0241565 A1 | 12/2004 | Kishiki et al. |
| 2006/0008723 A1 | 1/2006 | Fujikawa et al. |
| 2006/0063082 A1 | 3/2006 | Mikuriya et al. |
| 2009/0305158 A1 * | 12/2009 | Ono et al. .................. 430/109.4 |

FOREIGN PATENT DOCUMENTS

| | | |
|---|---|---|
| JP | 2002-284881 A | 10/2002 |
| JP | 2005-338816 A | 12/2005 |
| JP | 2006-119607 A | 5/2006 |
| WO | 01/60893 A1 | 8/2001 |
| WO | 03/073171 A1 | 9/2003 |
| WO | WO 2006129681 A1 * | 12/2006 |

OTHER PUBLICATIONS

Derwent abstract 1981-86209D for JP-56129220, Oct. 9, 1981 (publication date of JP-56129220).*
Chinese Office Action dated Jan. 10, 2011, issued in corresponding Chinese Patent Application No. 200780021704.5.
Examination Report dated Nov. 26, 2010, issued in corresponding GB Patent Application No. GB0821390.2.
Response to the Examination dated Mar. 21, 2011, issued in corresponding GB Patent Application No. GB0821390.2.
Notification of Grant dated May 31, 2011, issued in corresponding GB Patent Application No. GB0821390.2 (granted GB Patent Serial No. GB2451395).
Notice of Reasons for Refusal dated Sep. 10, 2010, issued in corresponding Japanese Patent Application No. 2007-157989.
International Search Report of PCT/JP2007/000631, mailing date of Sep. 4, 2007.
Notification of Transmittal of Translation of the International Preliminary Report on Patentability (Form PCT/IB/338) of International Application No. PCT/JP2007/000631 mailed Dec. 31, 2008 with Forms PCT/IB/373 and PCT/ISA/237.

* cited by examiner

*Primary Examiner* — Ling Choi
*Assistant Examiner* — Wenwen Cai
(74) *Attorney, Agent, or Firm* — Westerman, Hattori, Daniels & Adrian, LLP

(57) ABSTRACT

The present invention concerns a method for producing an aqueous dispersion (X1), the method including a step that includes mixing an aqueous dispersion liquid (W) of resin particles (A) comprising a resin (a) with a precursor (b0) of a resin (b) or an oily liquid (OL) comprising the precursor (b0) and an organic solvent to disperse the precursor (b0) or the oily liquid (OL) in the aqueous dispersion liquid (W), followed by causing the precursor (b0) to react in the aqueous dispersion liquid (W) to form resin particles (B) comprising the resin (b), thereby obtaining the aqueous dispersion (X1) of resin particles (C) having a structure where resin particles (A) are adhered on the surface of the resin particles (B), wherein at least one of the resin (a) and the resin (b) contains a polyester resin (p1) formed in the presence of a specific titanium catalyst (t) or a resin (p2) having the polyester resin (p1) as a constituent unit.

20 Claims, No Drawings

METHOD FOR PRODUCING RESIN DISPERSIONS AND RESIN PARTICLES

TECHNICAL FIELD

The present invention relates to methods for producing resin dispersions and resin particles, and to resin particles. More particularly, the invention relates to methods for producing resin particles useful in various applications and for producing aqueous dispersions thereof, and to resin particles.

BACKGROUND ART

A method which includes dispersing a resin (b) or a precursor (b0) of the resin (b) in an aqueous dispersion of resin particles (A), followed, if using the precursor (b0), by causing the precursor (b0) to react, to form resin particles (B) comprising the resin (b) in an aqueous dispersion of the resin particles (A), thereby forming an aqueous dispersion (X1) of resin particles (C) having a structure where the resin particles (A) are adhered on the surface of the resin particles (B), and the resin particles (B) and the resin particles (C) obtained by removing an aqueous medium from the aqueous dispersion (X1) are known (Patent document 1).
Patent document 1: WO 01/60893

DISCLOSURE OF THE INVENTION

Problems to be Solved by the Invention

However, there is a drawback with the above-mentioned resin particles that, in use for applications involving thermally melting the resin particles to make them adhered to an object (metal, paper, wood, or the like) firmly, their affinity to the object may be low depending on the kind of the object. Therefore, when using the resin particles as an additive for a coating, for example, the adhesiveness of a coating film to an object may be low, so that the coating film may peel off easily. When using as base particles of a toner, the adhesiveness to paper may be low, so that offset may occur at the time of low-temperature fixation.

An object of the present invention is to provide methods for producing with stability a resin dispersion containing resin particles which, even in use for applications involving thermally melting the resin particles to make them adhered to an object (metal, paper, wood, or the like) firmly, exhibit good adhesion (adhesiveness) to the object and which are uniform in particle diameter and for producing such resin particles stably.

Means for Solving the Problems

The present inventors found that the adhesion (adhesiveness) to an object could be improved by producing resin particles by using a resin prepared by use of a specific esterification catalyst and, as a result, they have reached the invention.

The present invention includes the following six aspects:

(I) a method for producing an aqueous dispersion (X1), the method including a step that includes mixing an aqueous dispersion liquid (W) of resin particles (A) comprising a resin (a) with a precursor (b0) of a resin (b) or an oily liquid (OL) comprising the precursor (b0) and an organic solvent to disperse the precursor (b0) or the oily liquid (OL) in the aqueous dispersion liquid (W), followed by causing the precursor (b0) to react in the aqueous dispersion liquid (W) to form resin particles (B) comprising the resin (b), thereby obtaining the aqueous dispersion (X1) of resin particles (C) having a structure where resin particles (A) are adhered on the surface of the resin particles (B), wherein at least one of the resin (a) and the resin (b) contains a polyester resin (p1) formed in the presence of a titanium catalyst (t) represented by the following general formula (I) or a resin (p2) having the polyester resin (p1) as a constituent unit:

Ti(—X)m(—OR)n     (I)

wherein R represents a hydrogen atom or a hydrocarbon group having 1 to 24 carbon atoms which may have 1 to 3 ether bonds and/or 1 to 2 hydroxyl groups, Ti represents a titanium atom, O represents an oxygen atom, and X represents a residue formed by removal of a hydrogen atom of one carboxyl group from an aromatic mono- or polycarboxylic acid, provided that when X is a polycarboxylic acid, other carboxyl groups may polycondense intramolecularly with OR groups in the same molecule to form a cyclic structure or may polycondense intermolecularly with OR groups of other molecules to form a structure having 2 to 5 titanium atoms, m=1 to 3, n=1 to 3, and the sum of m and n is 4;

(II) a method for producing an aqueous dispersion (X2), the method including a step that includes detaching the adhered resin particles (A) from the resin particles (B) in the aqueous dispersion (X1) obtained by the production method (I), followed by separating and removing the resin particles (A) from the aqueous dispersion to obtain the aqueous dispersion (X2) of the resin particles (B), or a step that includes dissolving the resin particles (A) in the aqueous dispersion (X1) to separate and remove the resin particles (A), thereby obtaining the aqueous dispersion (X2) of the resin particles (B);

(III) a method for producing resin particles, the method including a step that includes removing an aqueous solvent from the aqueous dispersion (X1) obtained by the production method (I) to obtain resin particles (C) or a step that includes removing an aqueous solvent from the aqueous dispersion (X2) obtained by the production method (II) to obtain the resin particles (B);

(IV) resin particles obtained by the production method (III);

(V) resin particles which are resin particles (C) having a structure where resin particles (A) comprising a resin (a) are adhered on the surface of resin particles (B) comprising a resin (b), wherein

[1] the [volume average particle diameter of resin particles (A)/volume average particle diameter of resin particles (C)] is 0.001 to 0.3,

[2] the volume average particle diameter of the resin particles (A) is 0.0005 to 30 μm and the volume average particle diameter of the resin particles (C) is 0.1 to 300 μm,

[3] 5% or more of the surface of the resin particle (B) is covered with the resin particle (A),

[4] the [volume average particle diameter/number average particle diameter] of the resin particles (C) is 1.0 to 1.5,

[5] at least one of the resin (a) and the resin (b) contains a polyester resin (p1) formed in the presence of a titanium catalyst (t) represented by the following general formula (I) or a resin (p2) containing the polyester resin (p1) as a constituent unit, and the resin (a) and/or the resin (b) contains, as needed, at least one resin selected from the group consisting of polyurethane resins, epoxy resins, vinyl resins and polyester resins other than the polyester resin (p1):

Ti(—X)m(—OR)n     (I)

wherein R represents a hydrogen atom or a hydrocarbon group having 1 to 24 carbon atoms which may have 1 to 3 ether bonds and/or 1 to 2 hydroxyl groups, Ti represents a titanium atom, O represents an oxygen atom, and X represents a residue formed by removal of a hydrogen atom of one carboxyl group from an aromatic mono- or polycarboxylic acid, provided that when X is a polycarboxylic acid, other carboxyl groups may polycondense intramolecularly with OR groups in the same molecule to form a cyclic structure or may polycondense intermolecularly with OR groups of other molecules to form a structure having 2 to 5 titanium atoms, m=1 to 3, n=1 to 3, and the sum of m and n is 4;

(VI) resin particles which are resin particles (B) comprising a resin (b) which includes a polyester resin (p1) formed in the presence of a titanium catalyst (t) represented by the following general formula (I) or a resin (p2) containing the polyester resin (p1) as a constituent unit and, as needed, containing at least one resin selected from the group consisting of polyurethane resins, epoxy resins, vinyl resins and polyester resins other than the polyester resin (p1), wherein

[1] the [volume average particle diameter/number average particle diameter] of the resin particles (B) is 1.0 to 1.5,

[2] the volume average particle diameter of the resin particles (B) is 0.1 to 300 μm:

Ti(—X)m(—OR)n     (I)

wherein R represents a hydrogen atom or a hydrocarbon group having 1 to 24 carbon atoms which may have 1 to 3 ether bonds and/or 1 to 2 hydroxyl groups, Ti represents a titanium atom, O represents an oxygen atom, and X represents a residue formed by removal of a hydrogen atom of one carboxyl group from an aromatic mono- or polycarboxylic acid, provided that when X is a polycarboxylic acid, other carboxyl groups may polycondense intramolecularly with OR groups in the same molecule to form a cyclic structure or may polycondense intermolecularly with OR groups of other molecules to form a structure having 2 to 5 titanium atoms, m=1 to 3, n=1 to 3, and the sum of m and n is 4.

Effects of the Invention

The present invention provides for the following effects.

1. It is possible to easily produce resin particles capable of exhibiting high affinity to an object (metal, paper, wood, or the like) even in use for applications involving thermally melting the resin particles to make them adhered to the object firmly. Therefore, for example, when resin particles obtained by the production method of the present invention are used as an additive for a coating, a coating film exhibits good adhesiveness to an object coated. Likewise, when the resin particles are used as base particles of a toner, they exhibit good adhesiveness to paper and offset fails to occur even in low-temperature fixation.

2. It is possible to stably produce a resin particle dispersion and resin particles which are uniform in particle diameter.

3. Since resin particles are formed in an aqueous dispersion liquid, resin particles can be produced with safety and at low cost.

BEST MODE FOR CARRYING OUT THE INVENTION

The present invention is now described in detail.

The present invention is characterized in that at least one of a resin (a) contained in resin particles (A) and a resin (b) contained in resin particles (B) contains a polyester resin (p1) formed in the presence of at least one titanium catalyst (t) represented by the general formula (I) or a resin (p2) having the polyester resin (p1) as a constituent unit. As to each of the polyester resin (p1) and the resin (p2), two or more species may be used. Moreover, the polyester resin (p1) and the resin (p2) may be used together. While the effect of the present invention can be obtained when the polyester resin (p1) or the resin (p2) is contained in either the resin (a) or the resin (b), it is preferable that the polyester resin (p1) or the resin (p2) be contained at least in the resin (b).

The titanium catalyst (t) is a compound expressed by the general formula (I). Two or more compounds of structures satisfying formula (I) may be used in combination.

In the general formula (I), R is a hydrogen atom or a hydrocarbon group having 1 to 24 carbon atoms which may contain 1 to 3 ether bonds and/or 1 to 2 hydroxyl groups. The number of carbon atoms of such hydrocarbon groups preferably is 1 to 6, and more preferably is 1 to 4.

Specific examples of hydrocarbon groups include: aliphatic hydrocarbon groups, and aliphatic hydrocarbon groups containing an ether bond and/or a hydroxyl group (e.g. methyl, ethyl, n-propyl, isopropyl, n-butyl, n-hexyl, n-octyl, β-methoxyethyl, β-ethoxyethyl and β-hydroxyethyl), aromatic hydrocarbon groups, and aromatic hydrocarbon groups containing an ether bond and/or a hydroxyl group [e.g. phenyl; hydroxyphenyl; and residues resulting from elimination of one hydroxyl group from alkylene oxides adducts (addition molar number: 1 to 3) of bisphenol (e.g. bisphenol A, bisphenol F or bisphenol AD) with alkylene oxides having 2 to 4 carbon atoms (henceforth, abbreviated as AO unless otherwise stated) [e.g. ethylene oxide (henceforth, abbreviated as EO), propylene oxide (henceforth, abbreviated as PO) and butylene oxide (henceforth, abbreviated as BO)].

Among such R, hydrocarbon groups having 1 to 6 carbon atoms are preferable, and ethyl, n-propyl, isopropyl, n-butyl and n-hexyl are more preferable. Particularly, n-propyl, isopropyl and n-butyl are preferable.

X is a residue produced from an aromatic mono- or polycarboxylic acid by eliminating a hydrogen atom from one carboxyl group. When X is a polycarboxylic acid, another carboxyl group (a carboxyl group other than that bonding to a titanium atom to form the residue) may intramolecularly polycondense with an OR group in the same molecule (i.e., a hydroxyl group directly bonding to the titanium atom, when R is H; an alkoxy group, when R is a hydrocarbon group; or a hydroxyl group, when R is a hydrocarbon group having one or two hydroxyl groups) to form a ring structure, or may intermolecularly polycondense with an OR group (the same as the foregoing) in another molecule to form a repetitive structure containing a plurality of (2 to 5) titanium atoms.

The aromatic carboxylic acid preferably is one having 7 to 50 carbon atoms, examples of which include aromatic monocarboxylic acids such as benzoic acids (e.g., benzoic acid, parahydroxybenzoic acid and paramethylbenzoic acid) and naphthalenemonocarboxylic acid; and di- to hexa-functional aromatic polycarboxylic acids, such as phthalic acids (e.g., terephthalic acid, isophthalic acid and orthophthalic acid), naphthalene dicarboxylic acid, trimellitic acid and pyromellitic acid.

When X is an aromatic polycarboxylic acid, a repetitive structure containing a plurality of titanium atoms may be formed of a plurality of carboxyl groups as previously mentioned, but in such a case, the number of the titanium atoms in one molecule is 2 to 5. The presence of six or more titanium atoms in one molecule is undesirable because it results in reduced catalytic activity.

Residues preferable as X are residues of phthalic acids (e.g., terephthalic acid, isophthalic acid and orthophthalic acid) and residues of benzoic acids (e.g., benzoic acid, parahydroxybenzoic acid and paramethylbenzoic acid), and an especially preferable residue is the residue of terephthalic acid, isophthalic acid, or orthophthalic acid.

In formula (I), m is 1 to 3, n is 1 to 3, and the sum of m and n, namely the bond valence of the titanium atom, is 4. It is preferable that m be 1 to 2 and n be 2 to 3. If m exceeds 3, the catalytic activity is deteriorated. On the other hand, if n exceeds 3, the hydrolysis resistance is deteriorated. Both situations are therefore undesirable in the production of a polyester resin. Cases where m is 1 or 2 are preferable because the catalytic activity is very high. Cases where the bond valence of a titanium atom is not 4 are undesirable because the catalytic activity is poor or a side reaction takes place even though the structure is similar to formula (I).

Specific examples of the compound expressed by the general formula (I) include titanium triisopropoxybenzenecarboxylate, titanium tributoxybenzenecarboxylate, titanium triisopropoxyterephthalate, titanium tributoxyterephthalate, titanium triisopropoxyisophthalate, titanium triisopropoxyphthalate, titanium diisopropoxydibenzenecarboxylate, titanium dibutoxydibenzenecarboxylate, titanium diisopropoxyditerephthalate, titanium dibutoxyditerephthalate, titanium diisopropoxydiisophthalate, titanium diisopropoxydiphthalate, titanium dihydroxydibenzenecarboxylate, titanium dihydroxyditerephthalate, titanium dihydroxydiisophthalate, titanium dihydroxydiphthalate, and their intramolecular or intermolecular polycondensates.

From the viewpoint of catalytic activity in polyester polymerization, the titanium catalyst (t) preferably has a solubility in water at 30° C. of 5 g/100 ml or less, more preferably 2 g/100 ml or less, and particularly preferably 1 g/100 ml or less. If the solubility is 5 g/100 ml or less, the catalyst is hardly hydrolyzed during a polymerization reaction, so that it excels in the durability of catalytic activity.

Such a titanium catalyst (t) can be obtained easily by, for example, causing a titanium tetraalkoxide and an aromatic carboxylic acid, both commercially available, to react by heating (preferably at 70 to 90° C.) in a reaction solvent (e.g., ethyl acetate).

As the polyester resin (p1), a polycondensate of a polyol with a polycarboxylic acid, or its acid anhydride or lower alkyl ester (the number of carbon atoms in the alkyl group is 1 to 4) may, for example, be used. As the polyol, diols (1), tri- to octa-hydric polyols (2), and the like may be used. As the polycarboxylic acid, or its acid anhydride or lower alkyl ester, dicarboxylic acids (3), tri- to hexa-functional polycarboxylic acids (4), and their acid anhydrides and lower alkyl esters, and the like may be used.

The polyol-to-polycarboxylic acid reaction ratio, as expressed in terms of the hydroxyl group [OH]-to-carboxyl group [COOH] equivalent ratio [OH]/[COOH], is preferably 2/1 to 1/2, more preferably 1.5/1 to 1/1.3, and particularly preferably 1.3/1 to 1/1.2.

Examples of the diols (1) include alkylene glycols having 2 to 30 carbon atoms (e.g., ethylene glycol, 1,2-propylene glycol, 1,3-propylene glycol, 1,4-butanediol, 1,6-hexanediol, octanediol, decanediol, dodecanediol, tetradecanediol, neopentyl glycol, and 2,2-diethyl-1,3-propanediol); alkylene ether glycols having a weight average molecular weight, measured by gel permeation chromatography and henceforth abbreviated as Mw, of 106 to 10000 (e.g., diethylene glycol, triethylene glycol, dipropylene glycol, polyethylene glycol, polypropylene glycol, and polytetramethylene ether glycol); alicyclic diols having 6 to 24 carbon atoms (e.g., 1,4-cyclohexanedimethanol and hydrogenated bisphenol A); adducts (addition molar number: 2 to 100) of AOs [e.g., EO, PO, BO] to the aforementioned alicyclic diols (e.g., 1,4-cyclohexanedimethanol-EO (10 mol) adduct); AO-adducts (addition molar number: 2 to 100) of bisphenols having 15 to 30 carbon atoms (e.g., bisphenol A, bisphenol F, and bisphenol S) or polyphenols having 6 to 24 carbon atoms (e.g., catechol, hydroquinone and resorcinol) (e.g., bisphenol A-EO (2 to 4 mol) adducts and bisphenol A-PO (2 to 4 mol) adducts); polylactonediols having an Mw of 100 to 5000 (e.g., poly-ε-caprolactonediol); and polybutadienediols having an Mw of 1000 to Among these, preferred are alkylene glycols (especially, 1,2-propylene glycol) and AO-adducts of bisphenols, and more preferred are AO-adducts of bisphenols and mixtures thereof with alkylene glycols.

Examples of the tri- to octahydric polyols (2) include tri- to octa-hydric aliphatic polyhydric alcohols having 3 to 8 carbon atoms (e.g., glycerol, trimethylolethane, trimethylolpropane, pentaerythritol, sorbitan, and sorbitol); AO-adducts (addition molar number: 2 to 100) of novolak resins having a degrees of polymerization of 3 to 50 (e.g., phenol novolak and cresol novolak) (phenol novolak-PO (2 mol) adduct and phenol novolak-EO (4 mol) adduct); AO-adducts (addition molar number: 2 to 100) of polyphenols having 6 to 30 carbon atoms (e.g., pyrogallol, phloroglucinol, and 1,2,4-benzenetriol) (e.g., pyrogallol-EO (4 mol) adduct); and acrylic polyols having a degree of polymerization of 20 to 2000 [e.g, copolymers of hydroxyethyl (meth)acrylate with another vinyl monomer (e.g., styrene, (meth)acrylic acid, or (meth)acrylic acid ester)].

Among these, preferred are aliphatic polyhydric alcohols and AO-adducts of novolak resins, and particularly preferred are AO-adducts of novolak resins.

The dicarboxylic acids (3) include alkanedicarboxylic acids having 4 to 32 carbon atoms (e.g., succinic acid, adipic acid, sebacic acid, azelaic acid, sebacic acid, dodecanedicarboxylic acid, and octadecanedicarboxylic acid); alkenedicarboxylic acids having 4 to 32 carbon atoms (e.g., maleic acid, fumaric acid, citraconic acid, and mesaconic acid), branched-chain alkenedicarboxylic acids having 8 to 40 carbon atoms [e.g., dimer acid, alkenylsuccinic acids (dodecenylsuccinic acid, pentadecenylsuccinic acid, octadecenylsuccinic acid); branched-chain alkanedicarboxylic acids having 12 to 40 carbon atoms [e.g., alkylsuccinic acids (decylsuccinic acid, dodecylsuccinic acid, octadecylsuccinic acid)], and aromatic dicarboxylic acids having 8 to 20 carbon atoms (e.g., phthalic acid, isophthalic acid, terephthalic acid, and naphthalenedicarboxylic acid).

Among these, preferred are alkenedicarboxylic acids and aromatic dicarboxylic acids, and more preferred are aromatic dicarboxylic acids.

The tri- to hexa-functional polycarboxylic acids (4) include aromatic polycarboxylic acids having 9 to 20 carbon atoms (trimellitic acid, pyromellitic acid, and the like).

The acid anhydrides of the dicarboxylic acids (3) or tri- to hexa-functional polycarboxylic acids (4) include trimellitic acid anhydride and pyromellitic acid anhydride. Lower alkyl esters thereof include methyl esters, ethyl esters, isopropyl esters, and the like.

It is preferable for the polyester resin (p1) that 80% or more, more preferably 90% or more, of the ester bonds of the polyester resin are formed by dehydration condensation. If within such ranges, durability and/or polluting property (degree of pollution due to scattering of a toner inside of a printer or a copier) become more satisfactory when being used as base particles of a toner.

The number average molecular weight (measured by gel permeation chromatography and henceforth abbreviated as Mn) of the polyester resin (p1) or the resin (p2) having the polyester resin (p1) as a constituent unit preferably is from 1,000 to 500,000, and more preferably is from 2,000 to 200,000.

The melting points (measured by DSC, hereafter ditto) of the polyester resin (p1) and the resin (p2) preferably are from 0 to 200° C., and more preferably are from 35 to 150° C.

The glass transition temperatures (Tg) (measured by DSC, hereafter ditto) of the polyester resin (p1) and the resin (p2) preferably are from −60 to 100° C., and more preferably are from −30 to 60° C.

The SP values (calculated by a method disclosed in Polymer Engineering and Science, February, 1974, Vol. 14, No. 2, pages 147-154) of the polyester resin (p1) and the resin (p2) preferably are from 7 to 18, and more preferably are from 8 to 14.

The polyester resin (p1) can be produced in the same manner as a conventional method of the production of polyester except for using the titanium catalyst (t). For example, it can be produced by carrying out a reaction under an inert gas (nitrogen gas, or the like) atmosphere, in the presence of a titanium catalyst (t), at a reaction temperature of preferably 150 to 280° C., more preferably 160 to 250° C., and particularly preferably 170 to 240° C. From the viewpoint of certain execution of a polycondensation reaction, the reaction time is preferably not less than 30 minutes, and particularly preferably 2 to 40 hours. It is also effective to reduce the pressure (for example, to 130 to 7000 Pa) for increasing the reaction velocity at the last stage of reaction.

From the viewpoint of polymerization activity, and the like, the amount of the titanium catalyst (t) added preferably is from 0.0001 to 0.8% by weight, more preferably is from 0.0002 to 0.6% by weight, and most preferably is from 0.0015 to 0.55% by weight, relative to the weight of a polymer to be obtained.

Other esterification catalysts may also be used in combination unless the catalytic effect of the titanium catalyst (t) is affected. Examples of such esterification catalysts include tin-containing catalysts (for example, dibutyltin oxide), antimony trioxide, titanium-containing catalysts other than the titanium catalyst (t) (for example, titanium alkoxides, potassium titanyl oxalate, and titanium terephthalate), zirconium-containing catalysts (for example, zirconium acetate), germanium-containing catalysts, alkali (or alkaline earth) metal catalysts (for example, carboxylates of alkali metal or alkaline earth metal: lithium acetate, sodium acetate, potassium acetate, calcium acetate, sodium benzoate and potassium benzoate), and zinc acetate. The added amount of such esterification catalysts preferably is 0 to 0.6% by weight relative to a resulting polymer. If the amount is adjusted to 0.6% by weight or less, a polyester resin less colored is obtained, which is preferable for use as base particles of a color toner. In use of such an esterification catalyst, the content of the titanium catalyst (t) preferably is 50 to 100% by weight relative to the overall weight of all the catalysts.

The resin (p2) having the polyester resin (p1) as a constituent unit includes polyurethane resins obtained from the polyester resin (p1) and a polyisocyanate (15) mentioned later, epoxy resins obtained from the polyester resin (p1) and a polyepoxide (18) mentioned later, polyamide resins obtained from the polyester resin (p1) and a polyamine (16) mentioned later, and the like.

Among such resins (p2), preferred are polyurethane resins and epoxy resins, and more preferred are polyurethane resins.

When the resin (a) contains a polyester resin (p1) or a resin (p2) having the polyester resin (p1) as a constituent unit, preferred as the polyester resin (p1) or the resin (p2) having the polyester resin (p1) as a constituent unit is the polyester resin (p1) and/or a polyurethane resin having the polyester resin (p1) as a constituent unit from the viewpoint that the adhesiveness to various objects is good.

The resin (a) may, as needed, contain one or more resins selected from the group consisting of polyurethane resins, epoxy resins, vinyl resins and polyester resins other than the polyester resin (p1) in addition to the polyester resin (p1) or the resin (p2) having the polyester resin (p1) as a constituent unit. Any resin may be used as long as it is a resin which is capable of forming the aqueous dispersion liquid (W). The resin (a) may contain a resin other than the aforesaid resins, such as a polyamide resin, a polyimide resin, a silicon resin, a phenol resin, a melamine resin, a urea resin, an aniline resin, an ionomer resin, a polycarbonate resin, or the like.

While the vinyl resin, the polyurethane resin, the epoxy resin, and the polyester resin other than the polyester resin (p1) will be described, other resins can be used like these resins.

The vinyl resin is a polymer obtained by homopolymerizing or copolymering vinyl monomers. Conventional polymerization catalysts can be used for the polymerization.

Examples of the vinyl monomers include (5) to (14) provided below.

(5) Vinyl Hydrocarbons:

(5-1) aliphatic vinyl hydrocarbons: alkenes having 2 to 12 carbon atoms (e.g., ethylene, propylene, butene, isobutylene, pentene, heptene, diisobutylene, octene, dodecene, octadecene, and α-olefins having 3 to 24 carbon atoms); alkadienes having 4 to 12 carbon atoms (e.g., butadiene, isoprene, 1,4-pentadiene, 1,6-hexadiene, and 1,7-octadiene).

(5-2) Alicyclic vinyl hydrocarbons: mono- or di-cycloalkenes having 6 to 15 carbon atoms (e.g., cyclohexene, vinylcyclohexene and ethylidenebicycloheptene), mono- or di-cycloalkadienes having 5 to 12 carbon atoms (e.g., (di)cyclopentadiene); and terpenes (e.g., pinene, limonene and indene), and the like.

(5-3) aromatic vinyl hydrocarbons: styrene; hydrocarbon (alkyl, cycloalkyl, aralkyl and/or alkenyl having 1 to 24 carbon atoms)-substituted styrenes (e.g., α-methylstyrene, vinyltoluene, 2,4-dimethylstyrene, ethylstyrene, isopropylstyrene, butylstyrene, phenylstyrene, cyclohexylstyrene, benzylstyrene, crotylbenzene, divinylbenzene, divinyltoluene, divinylxylene, and trivinylbenzene); and vinylnaphthalene, and the like.

(6) Carboxyl Group-Containing Vinyl Monomers and Salts Thereof:

Unsaturated monocarboxylic acids having 3 to 30 carbon atoms (e.g., (meth)acrylic acid (this means acrylic acid and/or methacrylic acid; henthforce the same applies), crotonic acid, isocrotonic acid, and cinnamic acid); unsaturated dicarboxylic acids (anhydrides) having 3 to 30 carbon atoms (e.g., maleic acid (anhydrous), fumaric acid, itaconic acid, citraconic acid (anhydride), and mesaconic acid); and monoalkyl (having 1 to 24 carbon atoms) esters of unsaturated dicarboxylic acids having 3 to 30 carbon atoms (e.g., monomethyl maleate, monooctadecyl maleate, monoethyl fumarate, monobutyl itaconate, itaconic acid glycol monoether, and monoeicosyl citraconate), and the like.

The salts of the carboxyl group-containing vinyl monomers include alkali metal salts (sodium salts, potassium salts, and the like), alkaline earth metal salts (calcium salts, magnesium salts, and the like), ammonium salts, amine salts, or quaternary ammonium salts. Amine salts may be any amine compounds without any particular limitations, and examples thereof include primary amine (ethylamine, butylamine, octylamine, and the like) salts, secondary amine (diethylamine, dibutylamine, and the like) salts, and tertiary amine (triethylamine, tributylamine, and the like) salts. Examples of quaternary ammonium salts include tetraethylammonium salt, triethyl laurylammonium salt, tetrabutylammonium salt, tributyl lauryl ammonium salt, and the like.

Specific examples of salts of carboxyl group-containing vinyl monomers include sodium acrylate, sodium methacrylate, monosodium maleate, disodium maleate, potassium acrylate, potassium methacrylate, monopotassium maleate, lithium acrylate, cesium acrylate, ammonium acrylate, calcium acrylate, aluminum acrylate, and the like.

(7) Sulfo Group-Containing Vinyl Monomers and Salts Thereof:

Alkenesulfonic acids having 2 to 14 carbon atoms (e.g., vinylsulfonic acid, (meth)allylsulfonic acid, and methylvinylsulfonic acid); styrenesulfonic acid and alkyl (having 2 to 24 carbon atoms) derivatives thereof (e.g., α-methylstyrenesulfonic acid); sulfo(hydroxy)alkyl-(meth)acrylate having 5 to 18 carbon atoms (e.g., sulfopropyl (meth)acrylate, 2-hydroxy-3-(meth)acryloxypropylsulfonic acid, 2-(meth)acryloyloxyethanesulfonic acid, and 3-(meth)acryloyloxy-2-hydroxypropanesulfonic acid); sulfo(hydroxy)alkyl(meth)acrylamides having 5 to 18 carbon atoms (e.g., 2-(meth)acryloylamino-2,2-dimethylethanesulfonic acid, 2-(meth)acrylamido-2-methylpropanesulfonic acid, and 3-(meth)acrylamido-2-hydroxypropanesulfonic acid); alkyl (having 3 to 18 carbon atoms) allylsulfosuccinic acid (e.g., propylallylsulfosuccinic acid, butylallylsulfosuccinic acid, and 2-ethylhexyl-allylsulfosuccinic acid); poly[n (degree of polymerization, henceforth the same applies)=2 to 30]oxyalkylene (oxyethylene, oxypropylene, oxybutylene: optionally homo, random or block) mono(meth)acrylate sulfuric acid ester [e.g., poly(n=5 to 15)oxyethylene monomethacrylate sulfuric acid ester, and poly(n=5 to 15)oxypropylene monomethacrylate sulfuric acid ester]; compounds represented by the following general formulae (7-1) to (7-3); salts thereof and the like.

Salts may employ counterions indicated for (6) carboxyl group-containing vinyl monomers and salts thereof.

[Chem. 1]

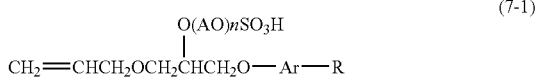

(7-1)

(7-2)

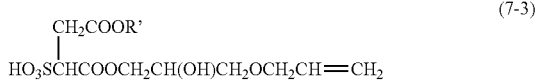

(7-3)

(wherein R represents an alkyl group having 1 to 15 carbon atoms; AO represents an oxyalkylene group having 2 to 4 carbon atoms; when n is plural, the oxyalkylene groups may be either the same or different and, when different, may be random, block and/or mixtures thereof, Ar represents a benzene ring; n represents an integer of 1 to 50; R' represents an alkyl group having 1 to 15 carbon atoms which may be substituted by fluorine atom).

(8) Phosphono Group-Containing Vinyl Monomers and Salts Thereof;

Phosphoric acid (meth) acryloyloxyalkyl monoesters (having 1 to 24 carbon atoms in an alkyl group) (e.g., 2-hydroxyethyl (meth)acryloylphosphate and phenyl-2-acryloyloxyethyl phosphate) and (meth)acryloyloxyalkyl phosphonates (having 1 to 24 carbon atoms in an alkyl group) (e.g., 2-acryloyloxyethyl phosphonate). Salts may employ counterions indicated for (6) carboxyl group-containing vinyl monomers and salts thereof (9) Hydroxyl Group-Containing Vinyl Monomers:

Hydroxystyrene, N-methylol(meth)acrylamide, hydroxyethyl (meth)acrylate, hydroxypropyl (meth)acrylate, polyethylene glycol mono(meth)acrylate, (meth)allyl alcohol, crotyl alcohol, isocrotyl alcohol, 1-buten-3-ol, 2-buten-1-ol, 2-butene-1,4-diol, propargyl alcohol, 2-hydroxyethyl propenyl ether, sucrose allyl ether, and the like.

(10) Nitrogen-Containing Vinyl Monomers:

(10-1) Amino Group-Containing Vinyl Monomers:

Aminoethyl (meth)acrylate, dimethylaminoethyl (meth)acrylate, diethylaminoethyl (meth)acrylate, t-butylaminoethyl methacrylate, N-aminoethyl(meth)acrylamide, (meth)allylamine, morpholinoethyl (meth)acrylate, 4-vinylpyridine, 2-vinylpyridine, crotylamine, N,N-dimethylaminostyrene, methyl α-acetoaminoacrylate, vinylimidazole, N-vinylpyrrole, N-vinylthiopyrrolidone, N-arylphenylenediamine, aminocarbazole, aminothiazole, aminoindole, aminopyrrole, aminoimidazole, and aminomercaptothiazole, salts thereof, and the like.

(10-2) Amide Group (Carbamoyl Group)-Containing Vinyl Monomers:

(Meth)acrylamide, N-methyl(meth)acrylamide, N-butylacrylamide, diacetoneacrylamide, N-methylol(meth)acrylamide, N,N'-methylenebis(meth)acrylamide, cinnamic acid amide, N,N-dimethylacrylamide, N,N-dibenzylacrylamide, methacrylformamide, N-methyl-N-vinylacetamide, N-vinylpyrrolidone, and the like.

(10-3) Nitrile Group (Cyano Group)-Containing Vinyl Monomers Having 3 to 10 Carbon Atoms:

(Meth)acrylonitrile, cyanostyrene, cyanoacrylate, and the like.

(10-4) Vinyl Monomers Containing a Group Having a Quaternary Ammonium Cation (Quaternary Ammonio Group):

Trimethylammonioethyl (meth)acrylate chloride, methyldiethylammonioethyl (meth)acrylate bromide, trimethylammonioethyl (meth)acrylamide methosulfate, benzyldiethylammonioethyl (meth)acrylamide carbonate, dimethyldiallylammonium chloride, trimethylallylammonium chloride, and the like.

(10-5) Nitro Group-Containing Vinyl Monomers Having 8 to 12 Carbon Atoms:

Nitrostyrene, and the like.

(11) Epoxy Group-Containing Vinyl Monomers Having 6 to 18 Carbon Atoms:

Glycidyl (meth)acrylate, tetrahydrofurfuryl (meth)acrylate, p-vinylphenylphenyl oxide, and the like.

(12) Halogen Atom-Containing Vinyl Monomers Having 2 to 16 Carbon Atoms:

Vinyl chloride, vinyl bromide, vinylidene chloride, allyl chloride, chlorostyrene, bromostyrene, dichlorostyrene, chloromethylstyrene, tetrafluorostyrene, chloroprene, and the like.

(13) Vinyl Esters, Vinyl (Thio)Ethers, Vinyl Ketones and Vinyl Sulfones:

(13-1) Vinyl Esters Having 4 to 16 Carbon Atoms:

Vinyl acetate, vinyl butyrate, vinyl propionate, vinyl butyrate, diallyl phthalate, diallyl adipate, isopropenyl acetate, vinyl methacrylate, methyl 4-vinyl benzoate, cyclohexyl methacrylate, benzyl methacrylate, phenyl (meth)acrylate, vinyl methoxyacetate, vinyl benzoate, ethyl α-ethoxyacrylate, alkyl (meth)acrylate having an alkyl group having 1 to 50 carbon atoms [e.g., methyl (meth)acrylate, ethyl (meth)

acrylate, propyl (meth)acrylate, butyl (meth)acrylate, 2-ethylhexyl (meth)acrylate, dodecyl (meth)acrylate, hexadecyl (meth)acrylate, heptadecyl (meth)acrylate, or eicosyl (meth) acrylate], dialkyl fumarate (each of the two alkyl groups is a straight, branched or alicyclic group having 2 to 8 carbon atoms), dialkyl maleate (each of the two alkyl groups is a straight, branched or alicyclic group having 2 to 8 carbon atoms), poly(meth)allyloxyalkanes [e.g., diallyloxyethane, triallyloxyethane, tetraallyloxyethane, tetraallyloxypropane, tetraallyloxybutane, and tetramethallyloxyethane], polyalkylene glycol chain-containing vinyl monomers [polyethylene glycol (number average molecular weight: 300) mono(meth) acrylate, polypropylene glycol (number average molecular weight: 500) monoacrylate, methyl alcohol EO (10 mol) adduct (meth)acrylate, and lauryl alcohol EO (30 mol) adduct (meth)acrylate], and poly(meth)acrylates [polyhydric alcohol poly(meth)acrylate: ethylene glycol di(meth)acrylate, propylene glycol di(meth)acrylate, neopentyl glycol di(meth) acrylate, trimethylolpropane tri(meth)acrylate, and polyethylene glycol di(meth)acrylate], and the like.

(13-2) Vinyl (Thio)Ethers Having 3 to 16 Carbon Atoms:

Vinyl methyl ether, vinyl ethyl ether, vinyl propyl ether, vinyl butyl ether, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, acetoxystyrene, and phenoxystyrene.

(13-3) Vinyl Ketones Having 4 to 12 Carbon Atoms:

Vinyl methyl ketone, vinyl ethyl ketone, and vinyl phenyl ketone.

(13-4) Vinyl Sulfones Having 2 to 16 Carbon Atoms:

Divinyl sulfide, p-vinyldiphenyl sulfide, vinylethyl sulfide, vinyl ethyl sulfone, divinyl sulfone, divinyl sulfoxide, and the like.

(14) Other Vinyl Monomers:

Isocyanatoethyl (meth)acrylate, m-isopropenyl-$\alpha,\alpha$-dimethylbenzyl isocyanate, and the like.

Among vinyl resins, as the polymer obtained by copolymerizing vinyl monomers (vinyl monomer copolymers), used is a polymer obtained by a binary or higher copolymerization of any combination of the monomers (5) to (14) described above at any ratio. Such polymers include styrene-(meth)acrylate copolymers, styrene-butadiene copolymers, (meth)acrylic acid-(meth)acrylate copolymers, styrene-acrylonitrile copolymers, styrene-maleic acid (anhydride) copolymers, styrene-(meth)acrylic acid copolymers, styrene-(meth)acrylic acid-divinylbenzene copolymers, styrene-styrenesulfonic acid-(meth)acrylate copolymers, and the like.

The resin (a) has to exist in the form of resin particles (A) in an aqueous dispersion liquid (W) and it, therefore, is necessary that the resin (a) is not completely dissolved in water at least under the conditions where it forms an aqueous dispersion (X1) (preferably, 5 to 90° C.). Therefore, when the vinyl resin is a copolymer, the proportion of the hydrophobic monomer and the hydrophilic monomer constituting the vinyl resin is preferably such that the hydrophobic monomer accounts for not less than 10% by weight, more preferably not less than 30% by weight, though it depends on the species of monomers chosen. If the proportion of the hydrophobic monomer is less than 10% by weight, the vinyl resin is prone to be water-soluble, so that the particle diameter uniformity of resin particles (C) may be adversely affected.

The hydrophilic monomer refers to monomers which dissolve in an amount of 100 g or more in 100 g of water at 25° C., and the hydrophobic monomer refers to monomers other than the foregoing ones (i.e., monomers which do not dissolve in an amount of 100 g or more in 100 g of water at 25° C.) (the same may be applied to the resins mentioned below).

The polyurethane resin includes polyaddition products of a polyisocyanate (15) and an active hydrogen compound (D) {water, polyols [the aforesaid diol (1) and polyols (2) with three to eight hydroxyl groups], the aforesaid dicarboxylic acid (3), the aforesaid polycarboxylic acids (4) with three to six carboxyl groups, polyamines (16), polythiols (17), and the like}.

For the polyaddition, conventional polymerization catalysts may be used.

The polyisocyanate (15) may for example be an aromatic polyisocyanate having 6 to 20 carbon atoms (excluding the carbon atoms in an NCO group, hereinafter the same applies), an aliphatic polyisocyanate having 2 to 18 carbon atoms, an alicyclic polyisocyanate having 4 to 15 carbon atoms, an araliphatic polyisocyanate having 8 to 15 carbon atoms as well as a modified product of such a polyisocyanate, and mixtures of any two or more substances listed above.

Specific examples of the aromatic polyisocyanate include 1,3- or 1,4-phenylene diisocyanate, 2,4- or 2,6-tolylene diisocyanate (TDI), crude TDI, 2,4'- or 4,4'-diphenylmethane diisocyanate (MDI), crude MDI {phosgenide of crude diaminophenylmethane [a condensation product of formaldehyde with an aromatic amine (e.g., aniline) or a mixture of different species thereof; a mixture of diaminodiphenylmethane and a small amount (e.g., 5 to 20% by weight) of a polyamine with three or more amino groups]; polyallyl polyisocyanate (PAPI)}, 1,5-naphthalene diisocyanate, 4,4',4"-triphenylmethane triisocyanate, m- or p-isocyanatophenylsulfonyl isocyanate, and the like.

Specific examples of the aliphatic polyisocyanate include ethylene diisocyanate, tetramethylene diisocyanate, hexamethylene diisocyanate (HDI), dodecamethylene diisocyanate, 1,6,11-undecane triisocyanate, 2,2,4-trimethylhexamethylene diisocyanate, lysine diisocyanate, 2,6-diisocyanatomethyl caproate, bis(2-isocyanatoethyl) fumarate, bis(2-isocyanatoethyl) carbonate, 2-isocyanatoethyl-2,6-diisocyanatohexanoate, and the like.

Specific examples of the alicyclic polyisocyanate include isophorone diisocyanate (IPDI), dicyclohexylmethane-4,4'-diisocyanate (hydrogenated MDI), cyclohexylene diisocyanate, methylcyclohexylene diisocyanate (hydrogenated TDI), bis(2-isocyanatoethyl)-4-cyclohexene-1,2-dicarboxylate, 2,5- or 2,6-norbornane diisocyanate, and the like.

Specific examples of the araliphatic polyisocyanate include m- or p-xylylene diisocyanate (XDI), $\alpha,\alpha,\alpha',\alpha'$-tetramethylxylylene diisocyanate (TMXDI), and the like.

Examples of the modified products of polyisocyanates include modified products by urethane modification, carbodiimide modification, allophanate modification, urea modification, biuret modification, urethodione modification, urethoimine modification, isocyanurate modification, or oxazolidone modification. Specific examples of such modified products include modified MDI (urethane-modified MDI, carbodiimide-modified MDI, trihydrocarbyl phosphate-modified MDI, and the like), urethane-modified TDI, and the like and mixtures of two or more of such products [for example, combination use of a modified MDI and a urethane-modified TDI (isocyanate-containing prepolymer)].

Preferred among these are aromatic polyisocyanates having 6 to 15 carbon atoms, aliphatic polyisocyanates having 4 to 12 carbon atoms and alicyclic polyisocyanates having 4 to 15 carbon atoms. Particularly preferred are TDI, MDI, HDI, hydrogenated MDI, and IPDI.

Examples of the polyamine (16) include aliphatic polyamines having 2 to 18 carbon atoms, alicyclic polyamines having 4 to 15 carbon atoms, heterocyclic polyamines having 4 to 15 carbon atoms, aromatic polyamines having 6 to 20 carbon atoms, polyamide polyamines, polyether polyamines, and the like.

Aliphatic Polyamines Having 2 to 18 Carbon Atoms

[1] Aliphatic Polyamines Having 2 to 6 Carbon Atoms

Alkylene diamines (ethylene diamine, propylene diamine, trimethylene diamine, tetramethylene diamine, hexamethylene diamine, and the like), polyalkylene (having 2 to 6 carbon atoms in alkylene) polyamines [diethylene triamine, iminobispropylamine, bis(hexamethylene)triamine, triethylene tetramine, tetraethylene pentamine, pentaethylene hexamine, and the like].

[2] Alkyl (Having 1 to 4 Carbon Atoms in Alkyl) or Hydroxyalkyl (Having 2 to 4 Carbon Atoms in Alkyl)-Substituted Forms of Aliphatic Polyamines Dialkyl(having 1 to 3 carbon atoms in alkyl)aminopropylamine, trimethylhexamethylene diamine, aminoethyl ethanolamine, 2,5-dimethyl-2,5-hexamethylene diamine, methyliminobispropylamine, and the like.

[3] Alicyclic Ring or Heterocyclic Ring-Containing Aliphatic Polyamines 3,9-Bis(3-aminopropyl)-2,4,8,10-tetraoxaspiro[5,5]undecane, and the like.

[4] Aromatic Ring-Containing Aliphatic Amines Having 8 to 15 Carbon Atoms

Xylylene diamine, tetrachloro-p-xylylene diamine, and the like.

Alicyclic Polyamines Having 4 to 15 Carbon Atoms 1,3-Diaminocyclohexane, isophoronediamine, menthenediamine, 4,4'-methylenedicyclohexanediamine (hydrogenated methylenedianiline), and the like.

Heterocyclic Polyamines Having 4 to 15 Carbon Atoms

Piperazine, N-aminoethylpiperazine, 1,4-diaminoethylpiperazine, 1,4-bis(2-amino-2-methylpropyl)piperazine, and the like.

Aromatic Polyamines Having 6 to 20 Carbon Atoms

[1] Unsubstituted Aromatic Polyamines 1,2-, 1,3- or 1,4-Phenylenediamine, 2,4'- or 4 4'-diphenylmethanediamine, crude diphenylmethanediamine (polyphenylpolymethylenepolyamine), diaminodiphenyl sulfone, benzidine, thiodianiline, bis(3,4-diaminophenyl)sulfone, 2,6-diaminopyridine, m-aminobenzylamine, triphenylmethane-4,4',4"-triamine, naphthylenediamine, and the like.

[2] Aromatic Polyamines Having a Nucleus-Substituting Alkyl Group [Alkyl having 1 to 4 Carbon Atoms (Methyl, Ethyl, n- or i-Propyl, Butyl, and the Like)]

2,4- or 2,6-Tolylenediamine, crude tolylenediamine, diethyltolylenediamine, 4,4'-diamino-3,3'-dimethyldiphenylmethane, 4,4'-bis(o-toluidine), dianisidine, diaminoditolylsulfone, 1,3-dimethyl-2,4-diaminobenzene, 1,3-diethyl-2,4-diaminobenzene, 1,3-dimethyl-2,6-diaminobenzene, 1,4-diethyl-2,5-diaminobenzene, 1,4-diisopropyl-2,5-diaminobenzene, 1,4-dibutyl-2,5-diaminobenzene, 2,4-diaminomesitylene, 1,3,5-triethyl-2,4-diaminobenzene, 1,3,5-triisopropyl-2,4-diaminobenzene, 1-methyl-3,5-diethyl-2,4-diaminobenzene, 1-methyl-3,5-diethyl-2,6-diaminobenzene, 2,3-dimethyl-1,4-diaminonaphthalene, 2,6-dimethyl-1,5-diaminonaphthalene, 2,6-diisopropyl-1,5-diaminonaphthalene, 2,6-dibutyl-1,5-diaminonaphthalene, 3,3',5,5'-tetramethylbenzidine, 3,3',5,5'-tetraisopropylbenzidine, 3,3',5,5'-tetramethyl-4,4'-diaminodiphenylmethane, 3,3',5,5'-tetraethyl-4,4'-diaminodiphenylmethane, 3,3',5,5'-tetraisopropyl-4,4'-diaminodiphenylmethane, 3,3',5,5'-tetrabutyl-4,4'-diaminodiphenylmethane, 3,5-diethyl-3'-methyl-2',4-diaminodiphenylmethane, 3,5-diisopropyl-3'-methyl-2',4-diaminodiphenylmethane, 3,3'-diethyl-2,2'-diaminodiphenylmethane, 4,4'-diamino-3,3'-dimethyldiphenylmethane, 3,3',5,5'-tetraethyl-4,4'-diaminobenzophenone, 3,3',5,5'-tetraisopropyl-4,4'-diaminobenzophenone, 3,3',5,5'-tetraethyl-4,4'-diaminodiphenylether, 3,3',5,5'-tetraisopropyl-4,4'-diaminodiphenyl sulfone, and the like] and mixtures of isomers thereof in various ratios.

[3] Aromatic Polyamines Having Nucleus-Substituting Electron-Withdrawing Groups {for Example, Halogen (e.g., F, Cl, Br and I) Atoms and Alkoxy (e.g., Methoxy and Ethoxy) Groups}

Methylenebis-o-chloroaniline, 4-chloro-o-phenylenediamine, 2-chloro-1,4-phenylenediamine, 3-amino-4-chloroaniline, 4-bromo-1,3-phenylenediamine, 2,5-dichloro-1,4-phenylenediamine, 5-nitro-1,3-phenylenediamine, 3-dimethoxy-4-aminoaniline, 4,4'-diamino-3,3'-dimethyl-5,5'-dibromodiphenylmethane, 3,3'-dichlorobenzidine, 3,3'-dimethoxybenzidine, bis(4-amino-3-chlorophenyl)oxide, bis(4-amino-2-chlorophenyl)propane, bis(4-amino-2-chlorophenyl)sulfone, bis(4-amino-3-methoxyphenyl)decane, bis(4-aminophenyl)sulfide, bis(4-aminophenyl)telluride, bis(4-aminophenyl)selenide, bis(4-amino-3-methoxyphenyl)disulfide, bis(4-amino-3-methoxyphenyl)disulfide, 4,4'-methylenebis(2-iodoaniline), 4,4'-methylenebis(2-bromoaniline), 4,4'-methylenebis(2-fluoroaniline), 4-aminophenyl-2-chloroaniline, and the like.

[4] Secondary Amino Group-Containing Aromatic Polyamines [Some or all of —NH$_2$ Groups in the Aromatic Polyamines [1] to [3] have been replaced by —NH—R' Groups (where R' Represents an Alkyl Group, e.g. a Lower Alkyl Group such as Methyl or Ethyl)]

4,4'-Di(methylamino)diphenylmethane, 1-methyl-2-methylamino-4-aminobenzene, and the like.

Polyamide Polyamines:

Low molecular weight polyamide polyamines obtainable by condensation of a dicarboxylic acid (e.g. dimer acid) with an excess (at least 2 mols per mol of the acid) of a polyamine (e.g. the alkylenediamine or polyalkylenepolyamine mentioned above).

Polyether Polyamines:

Hydrides of cyanoethylation products of polyether polyols (e.g. polyalkylene glycol), and the like.

The polythiol (17) includes ethylenedithiol, 1,4-butanedithiol, 1,6-hexanedithiol, and so forth.

The epoxy resin includes ring-opening polymerization products of polyepoxides (18), polyaddition products of polyepoxides (18) and active hydrogen compounds (D), cured products of the polyepoxides (18) with acid anhydrides of aforesaid dicarboxylic acids (3) or tri- to hexa-functional polycarboxylic acids (4), and the like.

The polyepoxide (18) is not particularly restricted provided that it contains two or more epoxy groups within the molecule. The species of polyepoxide (18) which are preferred from the viewpoint of the mechanical property have 2 to 6 epoxy groups in the molecule. The epoxy equivalent (molecular weight per epoxy group) of the polyepoxide (18) preferably is from 65 to 1000, and more preferably is 90 to 500. If the epoxy equivalent is within such a range, cured products are more improved in water resistance, chemical resistance and mechanical strength. On the other hand, it is difficult to synthesize a polyepoxide having an epoxy equivalent of less than 65.

Examples of the polyepoxide (18) include aromatic polyepoxides, heterocyclic polyepoxides, alicyclic polyepoxides, and aliphatic polyepoxides.

Examples of the aromatic polyepoxide include glycidyl ethers of polyhydric phenols, glycidyl esters of polyhydric phenols, glycidyl-aromatic polyamines, glycidylation products of aminophenols, and the like.

Examples of the polyhydric phenol glycidyl ether include bisphenol F diglycidyl ether, bisphenol A diglycidyl ether, bisphenol B diglycidyl ether, bisphenol AD diglycidyl ether, bisphenol S diglycidyl ether, halogenated bisphenol A diglycidyl ether, tetrachlorobisphenol A diglycidyl ether, catechin diglycidyl ether, resorcinol diglycidyl ether, hydroquinone diglycidyl ether, pyrogallol triglycidyl ether, 1,5-dihydroxynaphthaline diglycidyl ether, dihydroxybiphenyl diglycidyl ether, octachloro-4,4'-dihydroxybiphenyl diglycidyl ether, tetramethylbiphenyl diglycidyl ether, dihydroxynaphthylcresol triglycidyl ether, tris(hydroxyphenyl)methanetriglycidyl ether, dinaphthyl triol triglycidyl ether, tetrakis(4-hydroxyphenyl)ethane tetraglycidyl ether, p-glycidylphenyl dimethyl tryl bisphenol A glycidyl ether, trismethyl-tert-butyl-butylhydroxymethanetriglycidyl ether, 9,9'-bis(4-hydroxyphenyl)fluorene diglycidyl ether, 4,4'-oxybis(1,4-phenylethyl)tetracresol glycidyl ether, 4,4'-oxybis(1,4-phenylethyl)phenylglycidyl ether, bis(dihydroxynaphthalene)tetraglycidyl ether, phenol or cresol novolak resin glycidyl ether, limonene phenol novolak resin glycidyl ether, diglycidyl ether obtained by a reaction between 2 moles of bisphenol A and 3 moles of epichlorohydrin, polyphenol polyglycidyl ether obtained by a condensation reaction of phenol with glyoxazal, glutaraldehyde or formaldehyde, polyphenol polyglycidyl ether obtained by a condensation reaction of resorcin and acetone, and the like.

Examples of the glycidyl esters of polyphenols include diglycidyl phthalate, diglycidyl isophthalate, diglycidyl terephthalate, and the like.

Examples of the glycidyl aromatic polyamine includes N,N-diglycidylaniline, N,N,N',N'-tetraglycidylxylylenediamine, N,N,N',N'-tetraglycidyldiphenylmethanediamine, and the like.

Examples of the glycidylated aminophenols include p-aminophenol triglycidyl ether, and the like.

The aromatic polyepoxy compounds include diglycidyl urethane compounds obtained by an addition reaction of tolylene diisocyanate or diphenylmethane diisocyanate with glycidol, glycidyl group-containing polyurethane (pre)polymers obtained by causing tolylene diisocyanate or diphenylmethane diisocyanate, glycidol and polyol, and diglycidyl eters of AO adducts of bisphenol A.

The heterocyclic polyepoxide includes triglycidylmelamine, and the like.

Examples of the alicyclic polyepoxide include vinylcyclohexene dioxide, limonene dioxide, dicyclopentadiene dioxide, bis(2,3-epoxycyclopentyl)ether, ethylene glycol bisepoxydicyclopentyl ether, 3,4-epoxy-6-methylcyclohexylmethyl-3',4'-epoxy-6'-methylcyclohexanecarbox ylate, bis(3,4-epoxy-6-methylcyclohexylmethyl) adipate, bis(3,4-epoxy-6-methylcyclohexylmethyl)butylamine, dimer acid diglycidyl ester, nucleus-hydrogenated aromatic polyepoxides, and the like.

Examples of the aliphatic polyepoxide include polyglycidyl ethers of polyhydric aliphatic alcohols, polyglycidyl esters of polyvalent fatty acids, and glycidyl aliphatic amines.

The polyglycidyl ethers of polyhydric aliphatic alcohols include ethylene glycol diglycidyl ether, propylene glycol diglycidyl ether, tetramethylene glycol diglycidyl ether, 1,6-hexanediol diglycidyl ether, polyethylene glycol diglycidyl ether, polypropylene glycol diglycidyl ether, polytetramethylene glycol diglycidyl ether, neopentyl glycol diglycidyl ether, trimethylolpropane polyglycidyl ether, glycerol polyglycidyl ether, pentaerythritol polyglycidyl ether, sorbitol polyglycidyl ether, polyglycerol polyglycidyl ether, and the like.

The polyglycidyl esters of polyvalent fatty acids include diglycidyl oxalate, diglycidyl maleate, diglycidyl succinate, diglycidyl glutarate, diglycidyl adipate, diglycidyl pimelate, and the like.

The glycidyl aliphatic amines include N,N,N',N'-tetraglycidyl hexamethylenediamine, and the like.

The aliphatic polyepoxy compounds also include (co)polymers of diglycidyl ether and glycidyl (meth)acrylate.

Preferred among these are aliphatic polyepoxides and aromatic polyepoxides. In the present invention, the polyepoxide may be used in a combination of two or more species.

Specific examples of the polyester resin other than the polyester resin (p1) include products obtained from the same raw materials previously provided as examples of the aforementioned polyester resin (p1) except for failing to use the titanium catalyst (t). The preferable polyester resin is also same as the preferable one among the polyester resin (p1) except for that.

In the production method of the present invention, when mixing an aqueous dispersion liquid (W) of resin particles (A) comprising a resin (a) with a precursor (b0) of a resin (b) or an oily liquid (OL) comprising the precursor (b0) and an organic solvent [the oily liquid (OL) may, as needed, contain the resin (b)] to disperse the precursor (b0) or the oily liquid (OL) in the aqueous dispersion liquid (W), followed by causing the precursor (b0) to react to form resin particles (B) comprising the resin (b), the resin particles (A) are adsorbed to the surface of the resin particles (B). Therefore, the resin particles (B) or resin particles (C) become resistant to adhering to themselves. For this reason, the resin particles (C) are resistant to division even under high shear conditions. Because of such a phenomenon, the particle diameter of the resin particles (C) converges to a certain value, resulting in formation of resin particles which are uniform in particle diameter. Therefore, it is preferable for the resin particles (A) to have a strength such that they can resist breakage due to shear, to be resistant to dissolution or swelling in water, and to be resistant to dissolution or swelling in the precursor (b0) or the oily liquid (OL), at a temperature at which the precursor (b0), and the like are dispersed.

From the viewpoint of the particle diameter uniformity, powder flowability, heat resistance during storage, and stress resistance of the resin particles (C), the glass transition temperature (Tg) of the resin (a) preferably is 0 to 300° C., more preferably is 20 to 250° C., and even more preferably is 50 to 200° C. If the Tg value is lower than the temperature at which the aqueous resin dispersion (X1) is prepared, the effect of preventing the coalescence and cleavage and the effect of improving the particle diameter uniformity will be diminished.

From the viewpoint of inhibiting the resin particles (A) from dissolving or swelling in an aqueous solvent {a solvent composed of water and, as needed, an organic solvent (U)}, it is preferable to properly adjust the molecular weight, the SP value, the crystallinity, the molecular weight between crosslinking points, and the like of the resin (a).

The Mn of the resin (a) preferably is from 200 to 5,000,000, and more preferably is from 2,000 to 500,000. The SP value preferably is from 7 to 18, and more preferably is from 8 to 14. The melting point (measured by DSC) of the resin (a) preferably is 50° C. or higher, and more preferably is 80° C. or higher. When the resin particles (C) are wanted to be improved in heat resistance, water resistance, chemical resistance, particle diameter uniformity, and the like, a crosslinked structure may be introduced to the resin (a), for example, by using tri- or more functional monomers as a raw material. Such a crosslinked structure may be through any of covalent bonding, coordination bonding, ionic bonding, hydrogen bonding and so on. The molecular weight between crosslinking points in the case of introducing a crosslinked structure to the resin (a) preferably is 30 or more, and more preferably is 50 or more. On the other hand, in the case of obtaining an aqueous dispersion (X2) of resin particles (B) by separating and removing adhered resin particles (A) from the resin particles (B), it is preferable not to introduce a crosslinked structure to the resin (a).

While the technique of processing the resin (a) into an aqueous dispersion liquid (W) of the resin particles (A) is not particularly restricted, the following methods [1] to [8] can be provided as examples.

[1] As applicable to a vinyl resin, a method in which monomers are used as a starting material and an aqueous dispersion liquid of resin particles (A) is produced directly by a polymerization reaction, such as suspension polymerization, emulsion polymerization, seed polymerization or dispersion polymerization.

[2] As applicable to a polyaddition or condensation resin, such as a polyester resin, a polyurethane resin or an epoxy resin, a method which includes dispersing a precursor (monomer or oligomer) or an organic solvent (U) solution thereof in an aqueous solvent (a solvent composed of water and, as needed, an organic solvent (U)) in the presence of a suitable dispersant and, then, curing the precursor by heating or adding a curing agent to give an aqueous dispersion liquid of the resin particles (A).

[3] As applicable to a polyaddition or condensation resin, such as a polyester resin, a polyurethane resin, or an epoxy resin, a method which includes dissolving a proper emulsifier in a precursor (monomer or oligomer) or an organic solvent (U) solution thereof (which preferably is a liquid or may be liquefied by heating), then phase-invertingly emulsifying it by addition of water, and further causing it to cure by heating or adding a curing agent to give an aqueous dispersion liquid of resin particles (A).

[4] A method which includes preparing a resin by a polymerization reaction (which may be any polymerization reaction mode, such as addition polymerization, ring-opening polymerization, polyaddition polymerization, addition-condensation polymerization, condensation polymerization, and the like) in advance, crushing it with a mechanical rotary, jet type or other micropulverizer, classifying the resulting powder to obtain resin particles (A), and dispersing the resin particles thus obtained in an aqueous solvent in the presence of an appropriate dispersant, thereby producing a resin dispersion liquid of resin particles (A).

[5] A method which includes obtaining resin particles by atomizingly spraying a resin solution prepared by dissolving, in an organic solvent (U), a resin prepared beforehand by a polymerization reaction, and then dispersing the resin particles in an aqueous solvent in the presence of a proper dispersant to give an aqueous dispersion liquid of resin particles (A).

[6] A method which includes adding a poor solvent to a resin solution prepared by dissolution in an organic solvent (U) of a resin prepared beforehand by a polymerization reaction or cooling a resin solution prepared by dissolving the resin beforehand in an organic solvent (U) by heating, thereby precipitating resin particles; subsequently removing the organic solvent (U) to obtain the resin particles; and then dispersing the resin particles in an aqueous solvent in the presence of a proper dispersant to give a resin dispersion liquid of resin particles (A).

[7] A method which includes dispersing a resin solution prepared by dissolution in an organic solvent (U) of a resin prepared beforehand by a polymerization reaction in an aqueous solvent in the presence of a proper dispersant, and then removing the organic solvent (U) by heating or reducing pressure to give a resin dispersion liquid of resin particles (A).

[8] A method which includes dissolving a proper emulsifier in a resin solution prepared by dissolution in an organic solvent (U) of a resin prepared beforehand by a polymerization reaction, and then phase-invertingly emulsifying it by addition of an aqueous solvent to give a resin dispersion liquid of resin particles (A).

In the above methods [1] to [8], known surfactants (S), water-soluble polymers (T), and the like may be used as the emulsifier or dispersant used. Furthermore, an organic solvent (U), a plasticizer (V), and the like can be used together as an auxiliary emulsifier or dispersant.

The surfactant (S) includes an anionic surfactant (S-1), a cationic surfactant (S-2), an amphoteric surfactant (S-3), and a nonionic surfactant (S-4). As the surfactant (S), two or more surfactants may be used in combination.

The anionic surfactant (S-1) includes carboxylic acids, salts thereof, salts of sulfuric acid ester, salts of carboxymethylation products, salts of sulfonic acid, and salts of phosphoric acid esters.

The carboxylic acids and salts thereof include saturated or unsaturated fatty acids having 8 to 22 carbon atoms and salts thereof, and specific examples include capric acid, lauric acid, myristic acid, palmitic acid, stearic acid, arachidic acid, behenic acid, oleic acid, linoleic acid, ricinoleic acid, and mixtures of higher fatty acids obtainable by saponification of coconut oil, palm kernel oil, rice bran oil, beef tallow, and the like. As the salts, the salts of the aforesaid acids with sodium, potassium, ammonium, alkanolamines, and the like can be mentioned.

The salts of sulfuric acid esters include salts of higher alcohol esters of sulfuric acid (salts of aliphatic alcohol sulfates having 8 to 18 carbon atoms), salts of higher alkyl ether esters of sulfuric acid (salts of aliphatic alcohol-EO (1 to 10 mol) adducts sulfates having 8 to 18 carbon atoms), sulfated oil (obtainable by directly sulfating and neutralizing naturally occurring unsaturated oil or unsaturated wax), sulfated fatty acid esters (obtainable by sulfating and neutralizing lower alcohol esters of unsaturated fatty acids), and sulfated olefins (obtainable by sulfating and neutralizing olefins having 12 to 18 carbon atoms). As the salts referred to above, sodium salts, potassium salts, ammonium salts, and alkanolamine salts can be mentioned.

Specific examples of the higher alcohol sulfuric acid ester salts include salts of octyl alcohol sulfate, salts of decyl alcohol sulfate, salts of lauryl alcohol sulfate, salts of stearyl alcohol sulfate, sulfuric acid ester salts of alcohols synthesized using a Ziegler catalyst (e.g., "ALFOL 1214" produced by CONDEA), and sulfuric acid ester salts of alcohols synthesized by an oxo process (e.g., "Tridecanol" produced by Kyowa Hakko Kogyo Co., Ltd., "Oxocol 1213, 1215, 1415" produced by Nissan Chemical Industries, Ltd., "Dobanol 23, 25, 45" and "Diadol 115-L, 115H, 135" produced by Mitsubishi Chemical Corporation).

Specific examples of the higher alkyl ether sulfuric acid ester salts include lauryl alcohol-EO (2 mol) adduct sulfuric acid ester salts, and octyl alcohol-EO (3 mol) adduct sulfuric acid ester salts.

Specific examples of the sulfated oil include salts (sodium salts, potassium salts, ammonium salts and alkanolamine salts) of sulfation products of castor oil, peanut oil, olive oil, rape oil, beef tallow, mutton tallow, and the like.

Specific examples of the sulfated fatty acid ester include salts (sodium salts, potassium salts, ammonium salts and alkanolamine salts) of sulfation products of butyl oleate, butyl ricinoleate, and the like.

Specific examples of the sulfated olefins include Teepol produced by Shell Co.

Examples of the salts of carboxymethylation products include salts of carboxymethylation products of aliphatic alcohols having 8 to 16 carbon atoms, and salts of carboxymethylation products of adducts of aliphatic alcohols having 8 to 16 carbon atoms to 1 to 10 mol of EO.

Specific examples of the salts of carboxymethylation products of aliphatic alcohols include a sodium salt of carboxymethylated octyl alcohol, a sodium salt of carboxymethylated decyl alcohol, a sodium salt of carboxymethylated lauryl alcohol, a sodium salt of carboxymethylated sec-tridecanol 23, and a sodium salt of carboxymethylated tridecanol.

Specific examples of the salts of carboxymethylation products of aliphatic alcohol-EO (1 to 10 mol) adducts include a sodium salt of a carboxymethylation product of octyl alcohol-EO (3 mol) adduct, a sodium salt of a carboxymethylation product of laurylalcohol-EO (4 mol) adduct, a sodium salt of a carboxymethylation product of sec-tridecanol 23-EO (3 mol) adduct, and a sodium salt of a carboxymethylation product of tridecanol-EO (5 mol) adduct.

The sulfonic acid salt mentioned above includes (d1) salts of alkylbenzenesulfonic acids, (d2) salts of alkylnaphthalenesulfonic acids, (d3) sulfosuccinic acid diester type, (d4) salts of α-olefinsulfonic acids (Teepol), (d5) Igepon T series, and (d6) other sulfonic acid salts of aromatic ring-containing compounds.

Specific examples of the alkylbenzene sulfonates include sodium dodecylbenzensulfonate.

Specific examples of the alkylnaphthalene sulfonates include sodium dodecylnaphthalenesulfonate.

Specific examples of the sulfosuccinic acid diester types include sodium di-2-ethylhexyl sulfosuccinate.

Examples of other sulfonic acid salts of aromatic ring-containing compounds include alkylated diphenyl ether mono- or disulfonates and styrenated phenol sulfonates.

Examples of the salts of phosphoric acid esters include (e1) salts of higher alcohol phosphoric acid esters and (e2) salts of higher alcohol-EO adduct phosphates.

Specific examples of the higher alcohol phosphoric acid ester salts include lauryl alcohol phosphoric acid monoester disodium salt, and lauryl alcohol phosphoric acid diester sodium salt.

Specific examples of the higher alcohol-EO adduct phosphoric acid ester salts include oleyl alcohol-EO (5 mol) adduct phosphoric acid monoester disodium salt.

The cationic surfactant (S-2) includes quaternary ammonium salt type and amine salt type surfactants.

Examples of the quarternary ammonium salt type include lauryltrimethylammonium chloride, didecyldimethylammonium chloride, dioctyldimethylammonium bromide, stearyltrimethylammonium bromide, lauryldimethylbenzylammonium chloride (benzalkonium chloride), cetylpyridinium chloride, polyoxyethylenetrimethylammonium chloride, and stearamide ethyl diethylmethylammonium methosulfate.

The amine salt type surfactant can be obtained by neutralizing primary to tertiary amines with an inorganic acid (e.g., hydrochloric acid, nitric acid, sulfuric acid, or hydroiodic acid) or an organic acid (e.g., acetic acid, formic acid, oxalic acid, lactic acid, gluconic acid, adipic acid, or alkylphosphoric acid). For example, the primary amine salt type surfactant includes inorganic or organic acid salts of aliphatic higher amines (higher amines such as laurylamine, stearylamine, cetylamine, hydrogenated beef tallow amine, and rosin amine); and higher fatty acid (stearic acid, oleic acid, and the like) salts of lower amines. The secondary amine salt type surfactant includes inorganic or organic acid salts of aliphatic amine-EO adducts. The tertiary amine salt type surfactant includes inorganic or organic acid salts of aliphatic amines (triethylamine, ethyldimethylamine, N,N,N',N'-tetramethylethylenediamine, and the like), aliphatic amine-EO (2 mol or more) adducts, alicyclic amines (N-methylpyrrolidine, N-methylpiperidine, N-methylhexamethyleneimine, N-methylmorpholine, 1,8-diazabicyclo[5,4,0]-7-undecene, and the like), or nitrogen-containing heterocyclic aromatic amines (4-dimethylaminopyridine, N-methylimidazole, 4,4'-dipyridyl, and the like).

Examples of the amphoteric surfactant (S-3) include carboxylic acid salt type amphoteric surfactants.

The carboxylic acid salt type amphoteric surfactant includes amino acid type amphoteric surfactants, betaine type amphoteric surfactants, and imidazoline type amphoteric surfactants. The amino acid type amphoteric surfactant includes amphoteric surfactants having both amino and carboxyl groups within the molecule, including compounds of the following general formula, for instance:

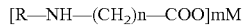

[R—NH—(CH$_2$)n—COO]mM

[wherein R represents a monovalent hydrocarbon group; n is 1 or 2; m is 1 or 2; M represents a hydrogen atom, an alkali metal atom, an alkaline earth metal atom, an ammonium cation, an amine cation, an alkanolamine cation, and the like].

Specific examples of the amino acid type amphoteric surfactant include alkylaminopropionic acid type amphoteric surfactants (sodium stearylaminopropionate, sodium laurylaminopropionate, and the like); alkylaminoacetic acid type amphoteric surfactants (sodium laurylaminoacetate, and the like); and glycin type amphoteric surfactants (sodium laurolylglycine, sodium lauryldiaminoethylglcyine, lauryldiaminoethylglycine hydrochloride, dioctyldiaminoethylglycine hydrochloride, and the like).

The betaine type amphoteric surfactant is an amphoteric surfactant having a quaternary ammonium salt type cationic moiety and a carboxylic acid type anionic moiety in the molecule, and includes alkyldimethyl betaines (stearyldimethylaminoacetic acid betaine, lauryldimethylaminoacetic acid betaine, and the like), amide betaines (coco-fatty acid amidopropyl betaine and the like), and alkyldihydroxyalkyl betaines (lauryldihydroxyethyl betaine and the like).

The imidazoline type amphoteric surfactant includes 2-undecyl-N-carboxymethyl-N-hydroxyethylimidazolinium betaine as an example.

The nonionic surfactant (S-4) includes AO adduct type nonionic surfactants, polyhydric alcohol type nonionic surfactants, and the like.

The AO adduct type nonionic surfactant referred to above can be obtained by any of the following reactions, namely by directly adding an AO to a higher alcohol, a higher fatty acid, an alkylamine, or the like, by reacting a higher fatty acid with a polyalkylene glycol obtainable by the addition reaction of an AO to a glycol, by adding an AO to an esterified product obtained by reacting a higher fatty acid with a polyhydric alcohol, or by adding an AO to a higher fatty acid amide.

Preferred among AOs are EO and random or block adducts of EO and PO.

The addition molar number of AO preferably is 10 to 50 mol. Among such AOs, those containing 50 to 100% by weight of EO are preferable.

Specific examples of the AO addition type nonionic surfactants include oxyalkylene alkyl ethers (e.g., octyl alcohol EO adducts, lauryl alcohol EO adducts, stearyl alcohol EO adducts, oleyl alcohol EO adducts, and lauryl alcohol EO-PO block adducts); polyoxyalkylene higher fatty acid esters (e.g., stearyl acid EO adducts and laurylic acid EO adducts); polyoxyalkylene polyhydric alcohol higher fatty acid esters (e.g., polyethylene glycol lauric acid diester, polyethylene glycol oleic acid diester, and polyethylene glycol stearic acid diester); polyoxyalkylene alkyl phenyl ethers (e.g., nonylphenol EO adducts, nonylphenol EO-PO block adducts, octylphenol EO adducts, bisphenol A-EO adducts, dinonylphenol EO adducts, and styrenated phenol EO adducts); polyoxyalkylene alkyl aminoethers (e.g., laurylamine EO adducts and stearylamine EO adducts); and polyoxyalkylene alkylalkanolamides (e.g., hydroxyethyl-lauric acid amide EO adducts, hydroxypropyloleic acid amide EO adducts, and dihydroxyethyllauric acid amide EO adducts).

The polyhydric alcohol type nonionic surfactant includes polyhydric alcohol fatty acid esters, polyhydric alcohol fatty acid ester-AO adducts, polyhydric alcohol alkyl ethers, and polyhydric alcohol alkyl ether-AO adducts.

As specific examples of the polyhydric alcohol fatty acid esters, there can be mentioned pentaerythritol monolaurate, pentaerythritol monooleate, sorbitan monolaurate, sorbitan monostearate, sorbitan monolaurate, sorbitan dilaurate, sorbitan dioleate, sucrose monostearate, and the like.

Examples of the polyhydric alcohol fatty acid ester AO adducts are ethylene glycol monooleate EO adducts, ethylene glycol monostearate EO adducts, trimethylolpropane monostearate EO-PO random adducts, sorbitane monolaurate EO adducts, sorbitane monostearate EO adducts, sorbitane distearate EO adducts, and sorbitane dilaurate EO-PO random adducts.

As specific examples of the polyhydric alcohol alkyl ethers, there can be mentioned pentaerythritol monobutyl ether, pentaerythritol monolauryl ether, sorbitan monomethyl ether, sorbitan monostearyl ether, methyl glycoside, lauryl glycoside, and the like.

Specific examples of polyhydric alcohol alkyl ether AO adducts are sorbitane monostearyl ether EO adducts, methyl glycoside EO-PO random adducts, lauryl glycoside EO adducts, and stearyl glycoside EO-PO random adducts.

The water-soluble polymer (T) includes cellulose compounds (e.g., methylcelulose, ethylcellulose, hydroxyethylcellulose, ethylhydroxyethylcellulose, carboxymethylcellulose, and hydroxypropylcellulose, and saponification products thereof), gelatin, starch, dextrin, gum arabic, chitin, chitosan, polyvinyl alcohol, polyvinylpyrrolidone, polyethylene glycol, polyethyleneimine, polyacrylamide, acrylic acid (salt)-containing polymers (sodium polyacrylate, potassium polyacrylate, ammonium polyacrylate, a sodium hydroxide-partial neutralization product of polyacrylic acid, a sodium acrylate-acrylate ester copolymer), a sodium hydroxide-(partial) neutralization product of a styrene-maleic anhydride copolymer, and water-soluble polyurethanes (e.g., reaction products of polyethylene glycol, polycaprolactonediol, and the like with a polyisocyanate).

The organic solvent (U) may, as needed, be added to the aqueous solvent at the time of emulsification-dispersion of the resin (a) or alternatively may be added to the dispersed-emulsified materials [the oily liquid (OL) containing the precursor (b0)].

Specific examples of the organic solvent (U) include aromatic hydrocarbon solvents {e.g., toluene, xylene, ethylbenzene, and tetralin}; aliphatic or alicyclic hydrocarbon solvents {e.g., n-hexane, n-heptane, mineral spirit, and cyclohexane}; halogen solvents {e.g., methyl chloride, methyl bromide, methyl iodide, methylene dichloride, carbon tetrachloride, trichloroethylene, and perchloroethylene}; ester or ester ether solvents {e.g., ethyl acetate, butyl acetate, methoxybutyl acetate, methylcellosolve acetate, and ethylcellosolve acetate}; ether solvents {e.g., diethyl ether, tetrahydrofuran, dioxane, ethyl cellosolve, butyl cellosolve, and propylene glycol monomethyl ether}; ketone solvents {e.g., acetone, methyl ethyl ketone, methyl isobutyl ketone, di-n-butyl ketone, and cyclohexanone}; alcohol solvents {e.g., methanol, ethanol, n-propanol, isopropanol, n-butanol, isobutanol, tert-butanol, 2-ethylhexyl alcohol, and benzyl alcohol}; amide solvents {e.g., dimethylformamide and dimethylacetamide}; sulfoxide solvents {e.g., dimethyl sulfoxide}; heterocyclic compound solvents {e.g., N-methylpyrrolidone}; and mixed solvents of two or more of the aforementioned solvents. Among these, solvents which can be mixed with water at any proportion at 25° C. (e.g., acetone and methanol) are preferred as the organic solvent (U) used in the aforementioned aqueous solvent.

The plasticizer (V) may, as needed, be added to the aqueous solvent at the time of emulsification-dispersion of the resin (a) or alternatively may be added to the dispersed-emulsified materials [the precursor (b0) or the oily liquid (OL)].

There are no limitations with the plasticizer (V) and examples thereof include (V1) phthalic acid esters [e.g., dibutyl phthalate, dioctyl phthalate, butyl benzyl phthalate, and diisodecyl phthalate]; (V2) aliphatic di-basic acid esters [e.g., di-2-ethylhexyl adipate and 2-ethylhexyl sebacate]; (V3) trimellitic acid esters [e.g., tri-2-ethylhexyl trimellitate and trioctyl trimellitate]; (V4) phosphoric acid esters [e.g., triethyl phosphate, tri-2-ethylhexyl phosphate, and tricresyl phosphate]; (V5) fatty acid esters [e.g., butyl oleate]; and (V6) mixtures of two or more of such esters.

The particle diameter of the resin particles (A) usually is smaller than the particle diameter of the resin particles (B), and from the viewpoint of particle diameter uniformity of the resin particles (C) or (B) to be obtained, the particle diameter ratio [volume average particle diameter of resin particles (A)/volume average particle diameter of resin particles (C)] value preferably is within the range of 0.001 to 0.3. The lower limit of the particle diameter ratio more preferably is 0.003, particularly preferably is 0.005, and the upper limit more preferably is 0.25, and particularly preferably is 0.1. If the particle diameter ratio is larger than 0.3, the resin particles (A) will not efficiently adsorb on the surface of the resin particles (B), so that the particle diameter distribution of the resin particles (C) to be obtained tends to be broad.

The volume average particle diameter of the resin particles (A) can be appropriately adjusted within the above range of particle diameter ratio so that it will be suited for the formation of the resin particles (C) of the desired particle diameter.

The volume average particle diameter of the resin particles (A) preferably is from 0.0005 to 30 μm. The upper limit more preferably is 20 μm, particularly preferably 10 μm, and most preferably 2 μm. The lower limit more preferably is 0.01 μm, particularly preferably 0.02 μm, and most preferably 0.04 μm. For example, when it is desired to obtain the resin particles (C) having a volume average particle diameter of 1 μm, the volume average particle diameter of the resin particles (A) preferably is within the range of 0.0005 to 0.3 μm, particularly is within the range of 0.001 to 0.2 g/m; when it is desired to obtain the resin particles (C) having a diameter of 10 μm, the volume average particle diameter of the resin particles (A) preferably is 0.005 to 3 μm, particularly is 0.04 to 2 μm, and most preferably is 0.05 to 1 μm; and when it is desired to obtain the resin particles (C) having a diameter of 100 μm, the volume average particle diameter of the resin particles (A) preferably is 0.05 to 30 μm, and particularly preferably 0.1 to 20 μm. The volume average particle diameter referred to above can be measured by means of a laser particle diameter distribution analyzer {for example, IA-920 (manufactured by Horiba)} or a Coulter counter [e.g., commercial name: Multisizer III (manufactured by Coulter)].

Since it is easy to obtain the aforesaid particle diameter ratio, the volume average particle diameter of the resin particles (B), mentioned later, preferably is from 0.1 to 300 μm. The upper limit more preferably is 250 μm, particularly preferably is 200 μm, and most preferably is 20 μm. The lower limit more preferably is 0.5 μm, particularly preferably is 1 am, and most preferably is 4 μm.

While the resin (b) contains a polyester resin (p1) or a resin (p2) having the polyester resin (p1) as a constituent unit, the resin (b) may not contain the polyester resin (p1) or the resin (p2) when the resin (a) contains the polyester resin (p1) or the resin (p2) having the polyester resin (p1) as a constituent unit because, as mentioned previously, it is only required that at least one of the resin (a) and the resin (b) contains a polyester resin (p1) formed in the presence of a titanium catalyst (t) represented by the general formula (I) or a resin (p2) having the polyester resin (p1) as a constituent unit.

When the resin (b) contains the polyester resin (p1) as a constituent unit, a precursor (b0) of the resin (b) contains the polyester resin (p1) as a constituent unit.

When the resin (b) contains a polyester resin (p1) or a resin (p2) having the polyester resin (p1) as a constituent unit, preferred as the polyester resin (p1) or the resin (p2) having the polyester resin (p1) as a constituent unit is a polyurethane resin having the polyester resin (p1) as a constituent unit.

The resin (b) may, as needed, contain one or more resins selected from the group consisting of polyurethane resins, epoxy resins, vinyl resins and polyester resins other than the polyester resin (p1) in addition to the polyester resin (p1) and the resin (p2). Specific examples thereof include those which are the same as the resin (a). The resin (b) may, as needed, contain a resin other than the resin obtained by causing the precursor (b0) of the resin (b) to react {e.g., a dead polymer mentioned later}.

The resin other than the polyester resin (p1) and the resin (p2) contained in the resin (b) may be selected appropriately according to an application and a purpose. Generally, preferred are polyurethane resins, epoxy resins, vinyl resins and polyester resins other than the polyester resin (p1), and more preferred are vinyl resins, polyurethane resins, polyester resins other than the polyester resin (p1), and their combinations.

The Mn, melting point, Tg, and SP value of the resin (b) can each be suitably controlled within the preferred range depending on the intended use of the resin particles (C) or the resin particles (B). By way of illustration, when the resin particles (C) and the resin particles (B) are to be used for a slush molding resin or a powder coating, the Mn of the resin (b) preferably is 2,000 to 500,000, and more preferably is 4,000 to 200,000. The melting point of the resin (b) preferably is 0 to 200° C., and more preferably is 35 to 150° C. The Tg of the resin (b) preferably is −60 to 100° C., and more preferably is −30 to 60° C. The SP value of the resin (b) preferably is 7 to 18, and more preferably is 8 to 14.

In use of the resin particles (C) or the resin particles (B) as a spacer for the production of electronic components (liquid crystal displays, and the like) or standard particles of electronic measuring instruments, the Mn of the resin (b) preferably is 20,000 to 10,000,000, and more preferably is 40,000 to 2,000,000. The melting point of the resin (b) preferably is 40 to 300° C., and more preferably is 70 to 250° C. The Tg of the resin (b) preferably is −0 to 250° C., and more preferably is 50 to 200° C. The SP value of the resin (b) preferably is 8 to 18, and more preferably is 9 to 14.

When the resin particles (C) or the resin particles (B) are used as base particles of a toner {base particles of a toner to be used for electrophotography, electrostatic recording, electrostatic printing, and the like}, the Mn of the resin (b) preferably is 1,000 to 5,000,000 and more preferably is 2,000 to 500,000. The melting point of the resin (b) preferably is 20 to 300° C., and more preferably is 80 to 250° C. The Tg of the resin (b) preferably is 20 to 200° C., and more preferably is 40 to 100° C. The SP value of the resin (b) preferably is 8 to 16, and more preferably is 9 to 14.

In the production method of the present invention, by mixing an aqueous dispersion liquid (W) of resin particles (A) comprising a resin (a) with a precursor (b0) of a resin (b) or an oily liquid (OL) comprising the precursor (b0) and an organic solvent [the oily liquid (OL) may, as needed, contain the resin (b)] to disperse the precursor (b0) or the oily liquid (OL) in the aqueous dispersion liquid (W), and then causing the precursor (b0) to react to form resin particles (B) comprising the resin (b) in the aqueous dispersion liquid of the resin particles (A), obtained is an aqueous dispersion (X1) of resin particles (C) having a structure where the resin particles (A) are adhered to the surface of the resin particles (B).

In dispersing the precursor (b0) of the resin (b) or the oily liquid (OL) comprising the precursor (b0) and an organic solvent in the aqueous dispersion liquid (W), a dispersing apparatus may be used.

The dispersing apparatus which can be used in the invention is not particularly restricted as long as it is on the market as an emulsion machine or a disperser. Examples thereof include batch type emulsion machines {e.g., Homogenizer (manufactured by IKA), Polytron (manufactured by Kinematica) and TK Auto Homomixer (manufactured by Tokushu Kika Kogyo)}; continuous emulsion machines {e.g., Ebara Milder (manufactured by Ebara Seisakusho), TK Filmix and TK Pipeline Homomixer (manufactured by Tokushu KiKa Kogyo), Colloid Mill (manufactured by Shinko Pantech), Slusher and Trigonal Wet Grinding Mill (manufactured by Mitsui Miike Kakoki), Capitron (manufactured by Eurotech), and Fine Flow Mill (manufactured by Pacific Machinery)}; high-pressure emulsion machines {e.g., Microfluidizer (manufactured by Mizuho Kogyo), Nanomizer (manufactured by Nanomizer), and APV Gaulin (manufactured by Gaulin)}; membrane emulsion machines {e.g., Membrane Emulsion Machine (manufactured by Reika Kogyo)}; vibrating emulsion machines {e.g., Vibromixer (manufactured by Reika Kogyo)}; and ultrasonic emulsion machines {e.g., Sonic Homogenizer (manufactured by Branson)}. Among these, preferred from the viewpoint of particle diameter uniformity are batch type emulsion machines, continuous emulsion machines, and high-pressure emulsion machines, and more preferred are APV Gaulin, Homogenizer, TK Auto Homomixer, Ebara Milder, TK Filmix, and TK Pipeline Homomixer.

In dispersing a precursor (b0) of the resin (b) in an aqueous dispersion liquid (W) of the resin particles (A), the precursor (b0) preferably is a liquid. When the precursor (b0) is solid at normal temperature, the dispersion may be performed at a temperature of not lower than the melting point of the precursor (b0).

From the viewpoint of particle diameter uniformity, the viscosity of the precursor (b0) of the resin (b) or of the oily liquid (OL) comprising the precursor (b0) and an organic solvent preferably is 10 to 50,000 mPa·s (measured with a B-type viscometer at a temperature during dispersion), and more preferably is 100 to 10,000 mPa·s.

The dispersing temperature preferably is 0 to 150° C. (under pressure), and more preferably is 5 to 98° C. When the viscosity is high, it is preferable to perform emulsification-dispersion while increasing the temperature and thereby decreasing the viscosity to the aforementioned preferable range.

The organic solvent to be used for forming the oily liquid (OL) is not particularly restricted as long as it is a solvent capable of dissolving the precursor (b0) at 25° C. to a temperature during dispersion. Specific examples thereof are the same as those of the organic solvent (U). While a preferable solvent varies depending on the type of the resin (b) obtained from the precursor (b0), one having an SP value difference from the resin (b) of 3 or less is preferred. From the viewpoint of particle diameter uniformity of the resin particles (C), the preferred solvent is a solvent which dissolves the resin (b) but hardly dissolves or swells the resin particles (A) comprising the resin (a).

The precursor (b0) of the resin (b) is not particularly restricted as long as it can be converted to the resin (b) through a chemical reaction. For example, when the resin (b) is a vinyl resin, the precursor (b0) may be the aforementioned vinyl monomer (which may be used either singly or in combination). When the resin (b) is a condensed resin (e.g., a polyurethane resin, an epoxy resin, or a polyester resin), the precursor (b0) may be a combination of a prepolymer ($\alpha$) having a reactive group and a curing agent ($\beta$).

When a vinyl monomer is used as the precursor (b0), examples of the method of causing the precursor (b0) to react to give the resin (b) include a method which includes dispersing and suspending an oil-soluble initiator, the vinyl monomer and, optionally as needed, an organic solvent (U) in an aqueous dispersion liquid (W) of the resin particles (A) in the presence of a water-soluble polymer (T) and heating the suspension to carry out a radical polymerization reaction (so-called suspension polymerization); and a method which includes emulsifying a vinyl monomer and, optionally as needed, the organic solvent (U) in an aqueous dispersion liquid (W) of resin particles (A) containing an emulsifier (which may for example be a species of the aforesaid surfactant (S)) and a water-soluble initiator and heating the mixture to subject it to a radical polymerization reaction (so-called emulsion polymerization).

It is noted that when using a vinyl monomer having a functional group which can react with a functional group (hydroxyl group, carboxyl group, or the like) which the polyester resin (p1) has and causing it to react with the polyester resin (p1) in advance, it is possible to obtain a vinyl resin having the polyester resin (p1) as a constituent unit.

Examples of the oil-soluble or water-soluble initiator mentioned above include peroxide polymerization initiators (I) and azo polymerization initiators (II). A peroxide polymerization initiator (I) may be used in combination with a reducing agent so as to form a redox polymerization initiator (III). Moreover, two or more of (I) to (III) may be used in combination.

(I) Peroxide Polymerization Initiators:

(I-1) Oil-soluble peroxide polymerization initiators: acetylcyclohexylsulfonyl peroxide, isobutyryl peroxide, diisopropyl peroxydicarbonate, di-2-ethylhexyl peroxydicarbonate, 2,4-dichlorobenzoyl peroxide, t-butyl peroxypivalate, 3,5,5-trimethylhexanonyl peroxide, octanoyl peroxide, decanoyl peroxide, lauroyl peroxide, stearoyl peroxide, propionitrile peroxide, succinic acid peroxide, acetyl peroxide, t-butylperoxy-2-ethylhexanoate, benzoyl peroxide, p-chlorobenzoyl peroxide, t-butyl peroxyisobutyrate, t-butylperoxymaleic acid, t-butyl peroxylaurate, cyclohexanone peroxide, t-butyl peroxyisopropylcarbonate, 2,5-dimethyl-2,5-dibenzoylperoxyhexane, t-butyl peroxyacetate, t-butyl peroxybenzoate, diisobutyl diperoxyphthalate, methyl ethyl ketone peroxide, dicumyl peroxide, 2,5-dimethyl-2,5-di-t-butylperoxyhexane, t-butylcumyl peroxide, t-butyl hydroperoxide, di-t-butyl peroxide, diisopropylbenzene hydroperoxide, p-menthane hydroperoxide, pinane hydroperoxide, 2,5-dimethylhexane-2,5-dihydroperoxide, cumene peroxide, and the like.

(I-2) Water-soluble peroxide polymerizaiton initiators: hydrogen peroxide, peracetic acid, ammonium persulfate, sodium persulfate, and the like.

(II) Azo Polymerizaiton Initiators:

(II-1) Oil-soluble azo polymerizaiton initiators: 2,2'-azobisisobutyronitrile, 1,1'-azobiscyclohexane-1-carbonitrile, 2,2'-azobis-4-methoxy-2,4-dimethylvaleronitirle, 2,2'-azobis-2,4-dimethylvaleronitrile, dimethyl-2,2'-azobis(2-methylpropionate), 1,1'-azobis(1-acetoxy-1-phenylethane), 2,2'-azobis(4-methoxy-2,4-dimethylvaleronitrile), and the like.

(II-2) Water-soluble azo polymerization initiators: azobisamidinopropane salt, azobiscyanovaleric acid (salt), 2,2'-azobis[2-methyl-N-(2-hydroxyethyl)propionamide], and the like.

(III) Redox Polymerization Initiators:

(III-1) Non-aqueous redox polymerization initiators: for example, a combination of an oil-soluble peroxide {such as hydroperoxide, dialkyl peroxide, or diacyl peroxide} and an oil-soluble reducing agent {such as a tertiary amine, a naphthenic acid salt, mercaptan, an organometal compound (e.g. triethylaluminum, triethylboron, or diethylzinc)}.

(III-2) Aqueous redox polymerization initiators: a combination of a water-soluble peroxide (persulfate, hydrogen peroxide, hydroperoxide, or the like) and a water-soluble inorganic or organic reducing agent (iron (II) salt, sodium hydrosulfite, alcohol, polyamine, or the like).

As the precursor (b0), a combination of a reactive group-containing prepolymer ($\alpha$) and a curing agent ($\beta$) can also be used. Herein, the "reactive group" means a group which may react with the curing agent ($\beta$). When the resin (b) contains the polyester resin (p1) as a constituent unit, it is preferable that the prepolymer ($\alpha$) in the precursor (b0) contains the polyester resin (p1) as a constituent unit.

Here, examples of the method of causing the precursor (b0) to react to form the resin (b) include a method which includes dispersing a reactive group-containing prepolymer ($\alpha$), a curing agent ($\beta$) and, optionally as needed, an organic solvent (U) in an aqueous dispersion liquid (W) of resin particles (A) and heating the resulting dispersion to cause the reactive group-containing prepolymer ($\alpha$) to react with the curing agent ($\beta$) to form resin particles (B) comprising the resin (b); a method which includes dispersing a reactive group-containing prepolymer ($\alpha$) or a solvent solution thereof in an aqueous dispersion liquid (W) of resin particles (A) and adding a water-soluble curing agent ($\beta$) thereto to cause it to react to form resin particles (B) comprising the resin (b); and a method, which is applicable to a case in which the reactive group-containing prepolymer ($\alpha$) reacts with water and cures, includes dispersing the reactive group-containing prepolymer ($\alpha$) or a solvent solution thereof in an aqueous dispersion liquid (W) of resin particles (A) to thereby cause the prepolymer to react with water to form resin particles (B) comprising the resin (b).

As regards the combination of the reactive group of the reactive group-containing prepolymer (α) and the curing agent (β), the following combinations [1], [2], and the like can be provided as examples.

[1]: A combination such that the reactive group of the reactive group-containing prepolymer (α) is a functional group (α1) reactive with an active hydrogen compound and the curing agent (β) is an active hydrogen compound (β1).

[2]: A combination such that the reactive group of the reactive group-containing prepolymer (α) is an active hydrogen-containing group (α2) and the curing agent (β) is a compound (β2) capable of reacting with the active hydrogen-containing group.

Among such combinations, the combination [1] is preferred from the viewpoint of the reaction rate in an aqueous solvent.

Referring to the above combination [1], the functional group (α1) which is reactive with an active hydrogen compound may, for example, be an isocyanate group (α1a), a blocked isocyanate group (α1b), an epoxy group (α1c), an acid anhydride group (1,3-oxo-2-oxapropylene group) (aid), or an acid halide group (halocarbonyl group) (α1e). Preferred among these are (α1a), (α1b), and (α1c), and particularly preferred are (α1a) and (α1b).

The blocked isocyanate group (α1b) is an isocyanate group blocked with a blocking agent. The blocking agent mentioned above includes oximes [acetoxime, methyl isobutyl ketoxime, diethyl ketoxime, cyclopentanone oxime, cyclohexanone oxime, methyl ethyl ketoxime, and the like]; lactams [γ-butyrolactam, ε-caprolactam, γ-valerolactam, and the like]; aliphatic alcohols having 1 to 20 carbon atoms [ethanol, methanol, octanol, and the like], phenols [phenol, m-cresol, xylenol, nonylphenol, and the like]; active methylene compounds [acetylacetone, ethyl malonate, ethyl acetoacetate, and the like]; basic nitrogen-containing compounds [N,N-diethylhydroxylamine, 2-hydroxypyridine, pyridine N-oxide, 2-mercaptopyridine, and the like]; and mixtures of two or more of these. Among these, oximes are preferred and methyl ethyl ketoxime is particularly preferred.

Examples of the constituent unit of the reactive group-containing prepolymer (α) include a polyether (αw), a polyester (αx), an epoxy resin (αy) and a polyurethane (αz). Preferred among these are (αx), (αy), and (αz), and particularly preferred are (αx) and (αz).

The polyether (αw) includes polyethylene oxide, polypropylene oxide, polybutylene oxide, polytetramethylene oxide, and the like.

The polyester (αx) includes the aforementioned polyester resin (p1) and/or a polyester resin other than the polyester resin (p1), polylactones (products of ring-opening polymerization of ε-caprolactone), and the like.

The epoxy resin (αy) includes addition-condensation products of bisphenols (bisphenol A, bisphenol F, bisphenol S, and the like) with epichlorohydrin, and the like.

The polyurethane (αz) includes polyaddition products of a diol (1) and/or a tri- to octa-hydric polyol (2) with a polyisocyanate (15), polyaddition products of a polyester (αx) and a polyisocyanate (15), and the like.

Examples of the method of introducing a reactive group into the polyester (αx), the epoxy resin (αy), the polyurethane (αz), or the like include the following two methods, and the like.

[1]: A method which includes using one of two or more components in excess to leave the functional group of the particular component at the terminal.

[2]: A method which includes using one of two or more components in excess to leave the functional group of the particular component at the terminal, and causing this remaining functional group to react with a compound having a functional group which is reactive with the residual functional group and a reactive group.

By the method [1], there can be obtained a hydroxyl group-containing polyester prepolymer, a carboxyl group-containing polyester prepolymer, an acid halide group (halocarbonyl group)-containing polyester prepolymer, a hydroxyl group-containing epoxy resin prepolymer, an epoxy group-containing epoxy resin prepolymer, a hydroxyl group-containing polyurethane prepolymer, an isocyanate group-containing polyurethane prepolymer, or the like.

Regarding the ratio of the two or more components, taking a hydroxyl group-containing polyester prepolymer as an example, the ratio of a polyol component to a polycarboxylic acid component, in terms of the hydroxyl group [OH]-to-carboxyl group [COOH] equivalent ratio, i.e. [OH]/[COOH], preferably is 2/1 to 1.01/1, more preferably is 1.5/1 to 1.01/1, and particularly preferably is 1.3/1 to 1.02/1. In the case of prepolymers having other skeletons and/or terminal groups, too, the ratio of components may be similar to the above, although the components are different.

In the method [2], the prepolymer obtained by the above method [1] can be reacted with a polyisocyanate to obtain an isocyanate group-containing prepolymer, with a blocked polyisocyanate to obtain a blocked isocyanate group-containing prepolymer, with a polyepoxide to obtain an epoxy group-containing prepolymer, or with an acid anhydride having 4 or more carbonyl groups to obtain an acid anhydride group (1,3-oxo-2-oxapropylene group)-containing prepolymer.

The level of use of the compound containing both a functional group and a reactive group is as follows. Taking the case in which a hydroxyl group-containing polyester is reacted with a polyisocyanate to give an isocyanate group-containing polyester prepolymer as an example, the polyisocyanate is used in such a proportion that the equivalent ratio of the isocyanate group [NCO] to the hydroxyl group [OH] of the hydroxyl group-containing polyester, i.e. [NCO]/[OH], preferably is 5/1 to 1.01/1, more preferably is 4/1 to 1.2/1, and particularly preferably is 2.5/1 to 1.5/1. In the case of prepolymers having other skeletons and/or terminal groups, too, the ratio of components may be similar to the above, although the components used are different.

The number of reactive groups per molecule in the reactive group-containing prepolymer (α) is generally not less than 1, preferably 1.5 to 3 on average, still more preferably 1.8 to 2.5 on average. Within the above range, the molecular weight of the cured product obtainable by reaction with the curing agent (β) is increased.

The Mn of the reactive group-containing prepolymer (α) preferably is 500 to 30,000, more preferably is 1,000 to 20,000, and particularly preferably is 2,000 to 10,000.

The Mw of the reactive group-containing prepolymer (α) preferably is 1,000 to 50,000, more preferably is 2,000 to 40,000, and particularly preferably is 4,000 to 20,000.

The viscosity of the reactive group-containing prepolymer (α) preferably is 2,000 poises or less, and more preferably is 1,000 poises or less at 100° C. Restricting the viscosity to 2,000 poises or less is beneficial in that resin particles (C) having a sharp particle diameter distribution can be obtained.

Examples of the active hydrogen compound (β1) include polyamines (β1a) which may be blocked with a removable compound, polyols (β1b), polymercaptans (β1c), water (β1d) and the like. Preferred among these are (β1a), (β1b) and (β1d), and more preferred are (β1a) and (β1d). Particularly preferred are blocked polyamines and (β1d).

Examples of the polyamines (β1a) include the same species as those of the polyamine (16). Preferred species among these are 4,4'-diaminodiphenylmethane, xylylenediamine, isophoronediamine, ethylenediamine, diethylenetriamine, triethylenetetramine, and mixtures thereof.

When the polyamine (β1a) is a polyamine blocked with a removable compound, examples thereof include ketimines obtainable from the aforesaid polyamines and a ketone having 3 to 8 carbon atoms (e.g., acetone, methyl ethyl ketone, or methyl isobutyl ketone), aldimines obtainable from aldehydes having 2 to 8 carbon atoms (e.g., formaldehyde or acetaldehyde), enamines, oxazolidines, and the like.

Examples of the polyol (β1b) include compounds the same as those provided as examples of the diol (1) and the tri- to octa-hydric polyols (2). Preferred is a diol (1) alone or a mixture of a diol (1) and a small amount of a polyol (2).

Examples of the polymercaptan (β1c) include ethylenedithiol, 1,4-butanedithiol, 1,6-hexanedithiol, and the like.

Where necessary, a reaction terminator (βs) may be used in combination with the active hydrogen compound (β1). By using such a reaction terminator with the active hydrogen compound (β1) in a certain ratio, the molecular weight of the resin (b) can be controlled to a predetermined level.

Examples of the reaction terminator (βs) include monoamines (diethylamine, dibutylamine, butylamine, laurylamine, monoethanolamine, diethanolamine, and the like); blocked monoamines (ketimine compounds and the like); monools (methanol, ethanol, isopropanol, butanol, phenol, and the like.); monomercaptans (butylmercaptan, laurylmercaptan, and the like); monoisocyanates (lauryl isocyanate, phenyl isocyanate, and the like); monoepoxides (butyl glycidyl ether and the like); and the like.

Referring to the above combination [2], examples of the active hydrogen-containing group (α2) of the reactive group-containing prepolymer (α) include an amino group (α2a), a hydroxyl group (an alcoholic hydroxyl group or a phenolic hydroxyl group) (α2b), a mercapto group (α2c), a carboxyl group (α2d), an organic group (α2e) derived by blocking any of the foregoing groups with a removable compound, and the like. Preferred among these are (α2a), (α2b), and the organic group (α2e) derived by blocking an amino group with a removable compound. Particularly preferred is (α2b).

Examples of the organic group derived by blocking an amino group with a removable compound include groups the same as those provided as examples of the aforesaid (β1a).

Examples of the compound (β2) reactive with the active hydrogen-containing group include polyisocyanates (β2a), polyepoxides (β2b), polycarboxylic acids (β2c), polyacid anhydrides (β2d), polyacid halides (β2e), and the like. Among these, (β2a) and (β2b) are preferred and (β2a) is still more preferred.

Examples of the polyisocyanate (β2a) referred to above include the same species as the polyisocyanate (15) and the preferred species are also the same as those mentioned.

Examples of the polyepoxide (β2b) include the same species as the polyepoxide (18) and the preferred species are also the same as those mentioned.

Examples of the polycarboxylic acid (β2c) include dicarboxylic acids (β2c-1) and polycarboxylic acids with three or more carboxyl groups (β2c-2). Preferred is (β2c-1) alone or a mixture of (β2c-1) and a small amount of (β2c-2).

Examples of the dicarboxylic acid (β2c-1) include the same species as those provided as examples of the aforesaid dicarboxylic acid (3), and examples of the polycarboxylic acid include the same species as those provided as examples of the aforesaid polycarboxylic acid (4) with three to six carboxyl groups. Preferred species are also the same as those previously mentioned.

Examples of the polycarboxylic anhydride (β2d) include pyromellitic anhydride, and the like.

Examples of the polyacid halide (β2e) include the same acid halides as those mentioned for (β2c) (acid chloride, acid bromide, and acid iodide).

Furthermore, where necessary, a reaction terminator (βs) can be used in conjunction with (β2).

Regarding the proportion of the curing agent (β), the ratio of the equivalent amount of the reactive group [α] in a reactive group-containing prepolymer (α) to the equivalent amount of the active hydrogen-containing group [β] in the curing agent (β), that is, [α]/[β], preferably is 1/2 to 2/1, more preferably is 1.5/1 to 1/1.5, and particularly preferably is 1.2/1 to 1/1.2. When the curing agent (β) is water (β1d), water is regarded as a bivalent active hydrogen compound.

The resin (b) obtained by causing the precursor (b0) composed of the reactive group-containing prepolymer (α) and the curing agent (β) to react in an aqueous solvent is used as components of the resin particles (B) and the resin particles (C). The Mw of the resin (b) which is the reaction product of a reactive group-containing prepolymer (α) and a curing agent (β) preferably is 3,000 or more, more preferably is 3,000 to 10,000,000, and particularly preferably is 5,000 to 1,000,000.

Furthermore, in an aqueous dispersion liquid (W), at the time of the reaction of the reactive group-containing prepolymer (α) with the curing agent (β), a polymer which is reactive with neither the reactive group-containing prepolymer (α) nor the curing agent (β) so-called dead polymer] may be allowed to be present in the reaction system. In this case, the resin (b) is a mixture of the resin formed by the reaction of the reactive group-containing prepolymer (α) with the curing agent (β) and the dead polymer.

As the dead polymer, preferred are a vinyl resin and a polyester resin. More preferred is a polyester resin, and particularly preferred is the polyester resin (p1).

The content of the dead polymer [a polymer other than the resin resulting from a reaction of the precursor (b0)] in the resin (b) preferably is 0 to 80% by weight, and more preferably is 5 to 70% by weight.

In the resin particles (A) and/or the resin particles (B), there may optionally be formulated other additives (a pigment, a filler, an antistatic agent, a colorant, a mold release agent, a charge control agent, an ultraviolet absorber, an antioxidant, an antiblocking agent, a heat stabilizer, a flame retardant, and the like). Regarding the method of mixing such other additives into the resin particles (A) or the resin particles (B), the additives may be incorporated in the course of formation of the aqueous dispersion (X1) in the aqueous dispersion liquid (W). However, it is more preferable to mix the additives with the resin (a) or a precursor (b0) of the resin (b) in advance and then add and disperse the resulting mixture in the aqueous dispersion liquid (W).

In the present invention, it is not necessary to have the additives incorporated during the formation of particles in an aqueous dispersion liquid (W). The additives may be added after formation of particles. For example, a colorant may be added in accordance with any well-known dyeing method after formation of resin particles containing no colorant, or the resin particles may be impregnated with the additives together with the organic solvent (U) and/or the plasticizer (V).

The used amount of the aqueous dispersion liquid (W) to 100 parts by weight of the resin (b) preferably is 50 to 2,000 parts by weight, and more preferably is 100 to 1,000 parts by weight. If it is 50 parts by weight or more, a good state of dispersion of the resin (b) is realized. Use in an amount of 2,000 parts by weight or less is economical.

While the extension and/or crosslinking reaction time is selected depending on the reactivity which depends on the combination of the structure of the reactive group of the prepolymer ($\alpha$) with the curing agent ($\beta$), it preferably is 10 minutes to 40 hours, and more preferably is 30 minutes to 24 hours. The reaction temperature preferably is 0 to 150° C., and more preferably is 50 to 120° C. Where necessary, a known catalyst can be used. Specifically, for the reaction between an isocyanate and an active hydrogen compound, for instance, dibutyltin laurate, dioctyltin laurate or the like can be used.

The resin particles (C) can be obtained by removing the aqueous solvent from the aqueous dispersion (X1). Examples of the method for removing the aqueous solvent include the methods shown below:

[1] a method in which the aqueous dispersion (X1) is dried under reduced pressure or normal pressure;

[2] a method in which the aqueous dispersion (X1) is subjected to a solid-liquid separation with a centrifuge, a sparkler filter, a filter press, or the like and the resulting powder is dried; and

[3] a method in which the aqueous dispersion (X1) is frozen and dried (the so-called lyophilization).

Referring to the method [1] or [2], the powder obtained may be dried by means of a known apparatus, such as a fluidized-bed dryer, a vacuum dryer, an air-circulation dryer, or the like. Furthermore, where necessary, the powder may be classified with an air classifier or the like apparatus to attain a predetermined particle diameter distribution.

For increasing the adhesion force between the resin particles (A) and the resin particles (B), it is effective to cause the resin particles (A) and the resin particles (B) to be reversely (positively or negatively) charged when dispersing the precursor (b0) or the oily liquid (OL) in the aqueous dispersion liquid (W), or, when the resin particles (A) and the resin particles (B) are equally charged, to use a surfactant (S) or a water-soluble polymer (T) charged reversely to the resin particles (A) and the resin particles (B), or to adjust the SP value difference of the resin (a) and the resin (b) to 2 or less.

From the viewpoint of, for example, particle diameter uniformity and storage stability of the resin particles (C), it is preferable that the resin particles (C) be composed of 0.1 to 50 (preferably 0.2 to 40) % by weight of the resin particles (A) and 50 to 99.9 (preferably 60 to 99.8) % by weight of the resin particles (B).

From the viewpoint of, for example, particle diameter uniformity, powder fluidity and storage stability of the resin particles (C), it is preferable that 5 (preferably 30, more preferably 80) % or more of the surface of the resin particles (B) be covered with the resin particles (A). The surface coverage can be calculated by means of the following equation based on an SEM (scanning electron microscope) image analysis.

Surface coverage (%)=(SA)×100/(SA)+(SB)

(SA): Area of a portion which is covered with the resin particle (A)

(SB): Area of the portion where the resin particle (B) is exposed

In light of particle diameter uniformity, the [volume average particle diameter/number average particle diameter] of the resin particles (C) preferably is 1.0 to 1.5, more preferably is 1.0 to 1.45, and particularly preferably is 1.05 to 1.15.

The volume average particle diameter of the resin particles (C), which may vary depending on the intended application, preferably is 0.1 to 300 µm. The upper limit more preferably is 250 µm, particularly preferably is 200 µm, and most preferably is 20 µm. The lower limit more preferably is 0.5 µm, particularly preferably is 1 µm, and most preferably is 4 µm.

Incidentally, the volume average particle diameter and the number average particle diameter can be concurrently measured with a Coulter counter.

The resin particles (C) can be provided with desired surface irregularities by controlling the particle diameters of the resin particles (A) and (B) and varying the surface coverage by the resin particles (A) on the surface of the resin particles (B).

For the purpose of improving powder flowability, the BET specific surface area of the resin particles (C) preferably is controlled to between 0.5 m$^2$/g and 5.0 m$^2$/g. The BET specific surface area may be measured with a specific surface area analyzer, such as a Quantasorb (manufactured by Yuasa Ionics) (measuring gas: He/Kr=99.9/0.1 vol %, calibration gas: nitrogen).

Likewise, from the viewpoint of powder flowability, the surface average centerline roughness Ra of the resin particles (C) preferably is 0.01 to 0.8 µm. Ra is the arithmetic mean of absolute values of the deviation between the roughness curve and its centerline and, for example, can be measured with a scanning probe microscopic system (manufactured by Toyo Technica).

The shape of the resin particles (C) is preferably spherical from the viewpoints of powder flowability, melt leveling and others. In this connection, it is preferable that the resin particles (A) and the resin particles (B) also be spherical. The Wadell practical sphericity of the resin particles (C) preferably is 0.85 to 1.00, and more preferably is 0.90 to 1.00. Incidentally, the Wadell practical sphericity can be calculated from the ratio of the diameter of a circle having an area equal to the projected area of a particle and the diameter of a circle having the smallest area as circumscribed to the projected image of the particle. The projected image of a particle can be obtained by, for example, a scanning electron microscope (SEM).

The aqueous resin dispersion (X2) of the resin particles (B) can be obtained by detaching the resin particles (A) from the resin particles (B) in the aqueous dispersion (X1) and removing the resin particles (A) from this aqueous dispersion or dissolving the resin particles (A) without dissolving the resin particles (B) in the aqueous dispersion (X1). The dissolved resin particles (A) may be separated and removed as needed.

Then, by removing the aqueous solvent from this aqueous dispersion (X2), the resin particles (B) can be obtained. As to the method of removing the aqueous solvent, the same methods as described for resin particles (C) can be employed.

Regarding the method for detaching the adhering resin particles (A) from the resin particles (B) in the aqueous dispersion (X1), the following methods can be provided as examples:

[1]: a method which includes sonicating the aqueous dispersion (X1);

[2]: a method which includes diluting the aqueous dispersion (X1) with a large amount of water or water-soluble organic solvent {methanol, ethanol, acetone, and the like}, followed by applying shear by stirring;

[3]: a method which includes adding an acid, an alkali or an inorganic salt to the aqueous dispersion (X1) and applying shear by stirring;

[4]: a method which includes heating the aqueous dispersion (X1) and applying shear by stirring; and

[5]: a method which includes, when the aqueous dispersion (X1) contains an organic solvent, distilling the organic solvent away.

The method for dissolving the resin particles (A) in the aqueous dispersion (X1) includes the following methods.

[1] As applicable to the case in which the resin (a) is a resin having an acidic functional group, e.g. a carboxyl group, a phosphono group, or a sulfo group (generally the molecular weight per acidic functional group is preferably not more than 1,000), a method including adding a base {e.g. sodium hydroxide, potassium hydroxide, ammonia, or DBU}, or an aqueous solution thereof to the aqueous dispersion (X1).

[2] As applicable to the case in which the resin (a) is a resin having a basic functional group, e.g. a primary amino group, a secondary amino group, a tertiary amino group, or a quaternary ammonio group (generally the molecular weight per basic functional group is preferably not more than 1,000), a method including adding an acid {e.g. hydrochloric aid, sulfuric acid, phosphoric acid, or acetic acid}, or an aqueous solution thereof to the aqueous dispersion (X1).

[3] As applicable to the case in which the resin (a) is soluble in the specified organic solvent (U) {generally the SP value difference between the resin (a) and the organic solvent (U) preferably is 2.5 or less}, a method which includes adding the specified organic solvent (U) to the aqueous dispersion (X1).

The method for removing the resin particles (A) or the dissolved resin particles (A) from the aqueous dispersion includes the following methods.

[1] A method in which the dispersion is filtered through filter paper, filter cloth, a mesh, and the like having a given mesh size to selectively remove the resin particles (B) only.

[2] A method in which the dispersion is centrifuged to selectively sediment the resin particles (B) and remove the resin particles (A) or the dissolved resin particles (A) contained in the supernatant.

A smooth surface or desired irregularities can be provided to the surface by varying the particle diameter ratio of the resin particles (A) to the resin particles (B), the surface coverage of the resin particles (A) on the surface of the resin particles (B) in the aqueous dispersion (X1), and the depth of embedment of the resin particles (A) in the resin particles (B) at the interface between the resin particle (B) and the aqueous solvent in the aqueous dispersion (X1).

The surface coverage of the resin particles (B) by the resin particles (A) and the depth of embedment of the resin particles (A) in the resin particles (B) can be controlled by the following methods.

[1] The coverage and the depth can be increased by imparting opposite charges to the resin particles (A) and the resin particles (B) in the production of the aqueous dispersion (X1). The increases in the coverage and the depth become greater as the charges of the resin particles (A) and (B) are respectively increased.

[2] When it is so arranged that both the resin particles (A) and the resin particles (B) are charged to the same polarity (positive or negative) in the production of the aqueous dispersion (X1), the coverage and the depth tend to be lowered and diminished. In this situation, when the surfactant (S) and/or the water-soluble polymer (T) [particularly one having an opposite charge to the resin particles (A) and the resin particles (B)] is employed, the coverage is increased. When the water-soluble polymer (T) is used, the higher the molecular weight of the water-soluble polymer (T) is, the smaller is the depth.

[3] When, in the production of the aqueous dispersion (X1), the resin (a) is a resin having an acidic functional group, e.g. a carboxyl group, a phosphono group, or a sulfo group (generally the molecular weight per acidic functional group is preferably not more than 1,000), the lower the pH of the aqueous solvent is, the greater are the coverage and the depth. Conversely, the higher the pH is, the smaller are the coverage and the depth.

[4] When, in the production of the aqueous dispersion (X1), the resin (a) is a resin having a basic functional group such as a primary amino group, a secondary amino group, a tertiary amino group, or a quaternary ammonio group (generally the molecular weight per basic functional group is preferably not more than 1,000), the higher the pH of the aqueous solvent is, the greater are the coverage and the depth. Conversely, the lower the pH of the aqueous solvent is, the lesser is the coverage and the depth of embedment.

[5] The smaller the SP value difference between the resin (a) and the resin (b) is, the greater are the coverage and the depth.

The volume average particle diameter of the resin particles (B), which may vary depending on the intended application, preferably is 0.1 to 300 µm. The upper limit more preferably is 250 µm, particularly preferably is 200 µm, and most preferably is 20 µm. The lower limit more preferably is 0.5 µm, particularly preferably is 1 µm, and most preferably is 4 µm. In light of particle diameter uniformity, the [volume average particle diameter/number average particle diameter] of the resin particles (B) preferably is 1.0 to 1.5, more preferably is 1.0 to 1.45, and particularly preferably is 1.05 to 1.15.

For improved powder flowability, it is preferable to adjust the BET specific surface area of the resin particles (B) to 0.5 to 5.0 m$^2$/g and the surface average centerline roughness Ra to 0.01 to 0.8 µm.

The shape of the resin particles (B) is preferably spherical from the viewpoints of powder flowability, melt leveling and other characteristics. Thus, the Wadell practical sphericity preferably is 0.85 to 1.00, more preferably is 0.90 to 1.00.

EXAMPLES

The following examples illustrate the present invention in further detail without defining the scope of the invention. In the description that follows, all "part(s)" are part(s) by weight and all "%" are % by weight.

The conditions of resin property measurements in Examples are as follows:

1. Glass Transition Temperature (Tg)

The method prescribed in ASTM D3418-82 (DSC method).

Instrument: DSC20, SSC/5803 manufactured by Seiko Instruments & Electronics Ltd.

2. Acid Value and Hydroxyl Value

The method prescribed in JIS K0070-1992.

3. Mn and Mw

Mn(s) and Mw(s) of a resin {a polyester resin is included} other than a polyurethane resin were measured on the following conditions about the tetrahydrofuran (THF) soluble part using gel permeation chromatography (GPC).

Instrument: HLC-8120 manufactured by Tosoh Corp.
Column: TSK gel GMHXL (two columns)
TSK gel Multipore HXL-M (one column)
Measurement temperature: 40° C.
Sample solution: 0.25% THF solution
Solution injection amount: 100 µL
Detection apparatus: Refractive index detector Reference material: Standard polystyrenes produced by Tosoh Corp. (TSK standard POLYSTYRENE) 12 points (molecular weight 1050, 2800, 5970, 9100, 18100, 37900, 96400, 190000, 355000, 1090000, 2890000 and 4480000)

The Mn and Mw of polyurethane resins were measured under the following conditions by GPC.

Instrument: HLC-8220GPC manufactured by Tosoh Corp.
Column: Guard column α
TSKgel α-M
Flow rate: 1 ml/min
Sample solution: 0.125% dimethylformamide solution
Solution injection amount: 100 μl
Temperature: 40° C.
Detection apparatus: Refractive index detector
Reference material: Standard polystyrenes produced by Tosoh Corp. (TSK standard POLYSTYRENE) 12 points (molecular weight 500, 1050, 2800, 5970, 9100, 18100, 37900, 96400, 190000, 355000, 1090000 and 2890000)

4. Volume Average Particle Diameter and Particle Size Distribution

The volume average particle diameter of the resin particles (C) was measured using a laser particle diameter distribution analyzer LA-920 (manufactured by Horiba) {1% dispersion liquid in ion exchange water, 25° C.}.

The volume average particle diameter and the particle size distribution {volume average particle diameter/number average particle diameter} of the resin particles (B) and the resin particles (C) were measured using a Coulter counter {Multisizer III, manufactured by Coulter} {0.5% dispersion liquid in ion exchange water, 25° C.}.

Production Example 1

Synthesis of Titanium Catalyst

A reaction tank equipped with a condenser, a stirrer and a nitrogen inlet tube capable of bubbling in a liquid was charged with 126 parts of ethyl acetate and 200 parts of terephthalic acid. While bubbling the liquid phase with nitrogen, the temperature was raised slowly to 60° C. While 1617 parts of titanium tetraisopropoxide was dropped, a reaction was carried out at 60° C. for 4 hours. Thus, a reaction mixture in the form of slurry was obtained. The reaction mixture was separated through filter paper and dried at 40° C./20 kPa. Thus, a mixture (t-1) of titanium triisopropoxyterephthalate and unreacted terephthalic acid (concentration of titanium triisopropoxyterephthalate: 65%) was obtained. The solubility of the mixture (t-1) in water was 0.6 g/100 ml and the solubility in water of titanium triisopropoxyterephthalate obtained by further refining was 0.9 g/100 ml.

Production Example 2

Synthesis of Titanium Catalyst

A reaction tank equipped with a condenser, a stirrer and a nitrogen inlet tube capable of bubbling in a liquid was charged with 520 parts of ethyl acetate and 340 parts of isophthalic acid. While bubbling the liquid phase with nitrogen, the temperature was raised slowly to 60° C. While 284 parts of titanium tetraisopropoxide was dropped, a reaction was carried out at 60° C. for 5 hours. Thus, a reaction mixture in the form of slurry was obtained. The reaction mixture was separated through filter paper and dried at 40° C./20 kPa. Thus, a mixture of titanium diisopropoxydiisophthalate and unreacted isophthalic acid (t-2) (concentration of titanium diisopropoxydiisophthalate: 95%) was obtained. The solubility of the mixture (t-2) in water was 0.3 g/100 ml and the solubility in water of titanium diisopropoxydiisophthalate obtained by further refining was also 0.3 g/100 ml.

Production Example 3

Synthesis of Titanium Catalyst

A reaction tank equipped with a condenser, a stirrer and a nitrogen inlet tube capable of bubbling in a liquid was charged with 520 parts of ethyl acetate and 244 parts of benzoic acid. While bubbling the liquid phase with nitrogen, the temperature was raised slowly to 60° C. While 284 parts of titanium tetraisopropoxide was dropped, a reaction was carried out at 60° C. for 5 hours. Then, 50 parts of ion exchange water was added, followed by a reaction for 30 minutes. Thus, a reaction mixture in the form of slurry was obtained. The reaction mixture was separated through filter paper and dried at 40° C./20 kPa. Thus, a titanium catalyst {titanium dihydroxydibenzenecarboxylate} (t-3) was obtained. The solubility of the titanium catalyst (t-3) in water was 0.1 g/100 ml.

Production Example 4

Synthesis of Amine-Cured Epoxy Resin Aqueous Dispersion Liquid [Resin Particle (A-1) Dispersion]

A reaction vessel fitted with a stirring rod and a thermometer was charged with 48 parts of a styrenated phenol-EO adduct (Eleminol HB-12, produced by Sanyo Chemical Industries) and 232 parts of bisphenol A diglycidyl ether (Epikote 828, produced by Yuka-Shell) to prepare a homogeneous solution at 40° C. Subsequently, under stirring, water was added dropwise into the reaction vessel. When 30 parts of water had been charged, the content in the reaction vessel became emulsified and assumed a milk-white color. Then, 225 parts of water was further added dropwise to give an emulsion. After this emulsion was heated to have a temperature of 70° C., the mixed solution of 20 parts of ethylenediamine and 446 parts of water was dropped over two hours while maintaining the emulsion at 70° C. After completion of dropwise addition, the reaction and maturing were carried out at 70° C. for 5 hours and at 90° C. for 5 hours to give an amine-cured epoxy resin aqueous dispersion liquid [resin particle (A-1) dispersion].

The volume average particle diameter of the [resin particle (A-1) dispersion] was 0.85 μm. Part of the resin particle (A-1) dispersion was subjected to centrifugal separation, followed by repeating twice a step including addition of water in an amount of 10 weight times the resin particles (A-1) and subsequent centrifugal separation, and then drying {40° C.×12 hours}. Thus, the {resin particles (A-1)} were isolated. The Tg (measured by DSC) of the resin particles (A-1) was 118° C.

Production Example 5

Synthesis of Vinyl Resin Aqueous Dispersion [Resin Particle (A-2) Dispersion]

A reaction vessel fitted with a stirring rod and a thermometer was charged with 682 parts of water, 11 parts of methacrylic acid-EO adduct sulfate ester sodium salt (Eleminol RS-30, produced by Sanyo Chemical Industries), 138 parts of styrene, 138 parts of methacrylic acid, and 1 part of ammonium persulfate, and the whole was stirred at 25° C. at 400 rpm for 15 minutes to give a white emulsion. This emulsion was heated to have a temperature of 75° C. and then was caused to react for 5 hours. Then, 30 parts of a 1% aqueous solution of ammonium persulfate was added and the mixture was matured at 75° C. for 5 hours to give an aqueous dispersion of a vinyl resin (styrene/methacrylic acid/methacrylic acid-EO adduct sulfate ester sodium salt copolymer) [resin particle (A-2) dispersion].

The volume average particle diameter of the [resin particle (A-2) dispersion] was 0.10 μm. Part of the [resin particles (A-2) dispersion] was dried, and thereby the resin particles (A-2) were isolated. The Tg of the resin particles (A-2) was 148° C.

Production Example 6

Synthesis of Dispersion of Mixture of Water-Extension Reaction Product of [Urethane Prepolymer 1] and [Polyester Resin p1-2] [Resin Particle (A-3) Dispersion]

To a reaction vessel equipped with a stirring device and a dewatering device, 681 parts of a bisphenol A-EO (2 mol) adduct, 81 parts of a bisphenol A-PO (2 mol) adduct, 275 parts of terephthalic acid, 7 parts of adipic acid, 22 parts of trimellitic anhydride, and 2 parts of the mixture obtained in Production Example 1 (titanium catalyst) (t-1) as a condensation catalyst were added and then a dehydration reaction was performed under normal pressure at 230° C. for 5 hours. Then, a dehydration reaction was performed under a reduced pressure of 400 Pa for 5 hours. Thus, a [polyester resin p1-1] was obtained. The [polyester resin p1-1] had a Tg of 54° C., an Mn of 2300, an Mw of 9610, an acid value of 0.4, and a hydroxyl value of 53.

To an autoclave, 407 parts of the [polyester resin p1-1], 54 parts of IPDI and 485 parts of ethyl acetate were charged and then a reaction was performed in a hermetically-sealed state at 100° C. for 8 hours. Thus, a solution of a [urethane prepolymer 1] which had the polyester resin (p1-1) as a constituent unit and an isocyanate group at a molecular terminal was obtained. The NCO content of the [urethane prepolymer 1] solution was 1.1%.

On the other hand, like the above, 570 parts of a bisphenol A-EO (2 mol) adduct, 217 parts of terephthalic acid, and 2 parts of the mixture obtained in Production Example 1 (titanium catalyst) (t-1) were subjected to polycondensation under normal pressure at 230° C. for 8 hours. Thus, a [polyester resin p1-2] having an Mn of 2450, a hydroxyl value of 50, and an acid value of 5 was obtained.

In 2,000 parts of ethyl acetate were dissolved 400 parts of the [urethane prepolymer 1] solution and 800 parts of the [polyester resin p1-2], followed by mixing to give a [resin solution 1]. Part of the [resin solution 1] was dried under reduced pressure {1300 Pa, 40° C., 8 hours} to isolate a resin fraction. The Tg of this resin fraction was 55° C.

A beaker was charged with 500 parts of water and 4 parts of a nonylphenol-EO (14 mol) adduct (Nonipol 200, product of Sanyo Chemical Industries), which was dissolved homogeneously. While this solution was stirred using a TK Homomixer at 18,000 rpm, the [resin solution 1] was added and the mixture was stirred for 15 minutes. This mixture was transferred to a reaction vessel equipped with a stirring rod and a thermometer, in which it was heated to distill off the ethyl acetate and further to 98° C., at which temperature the reaction was carried out for 5 hours to give a [resin particle (A-3) dispersion] including a mixture of the water-extension reaction product of the [urethane prepolyester 1] and the [polyester resin p1-2].

The volume average particle diameter of the [resin particle (A-3) dispersion] was 0.20 μm. Part of the resin particle (A-3) dispersion was subjected to centrifugal separation, followed by repeating twice a step including addition of water in an amount of 10 weight times the resin particles (A-3) and subsequent centrifugal separation, and then drying {40° C.×12 hours}. Thus, the resin particles (A-3) were isolated. The Tg of the resin particles (A-3) was 73° C.

Production Example 7

Synthesis of [Polyester Resin p1-3]

To a reaction vessel equipped with a stirring device and a dewatering device, 218 parts of a bisphenol A-EO (2 mol) adduct, 537 parts of a bisphenol A-PO (3 mol) adduct, 213 parts of terephthalic acid, 47 parts of adipic acid, and 2 parts of the mixture obtained in Production Example 1 (titanium catalyst) (t-1) were charged and then a dehydration reaction was performed under normal pressure at 230° C. for 5 hours. Then, a dehydration reaction was performed under a reduced pressure of 400 Pa for 5 hours. After cooling to 180° C., 43 parts of trimellitic anhydride was charged and a reaction was performed under normal pressure for 2 hours. Thus, a [polyester resin p1-3] was obtained. The [polyester resin p1-3] had a Tg of 45° C., an Mn of 2640, an Mw of 6390, and an acid value of 24.

Production Example 8

Synthesis of [Polyester Resin p1-4]

A [polyester resin p1-4] was obtained in the same manner as in <Production Example 7>, except for using the mixture obtained in Production Example 2 (titanium catalyst) (t-2) instead of the mixture (t-1). The [polyester resin p 1-4] had a Tg of 46° C., an Mn of 2780, an Mw of 6620, and an acid value of 25.

Production Example 9

Synthesis of [Polyester Resin p1-5]

A [polyester resin p1-5] was obtained in the same manner as in <Production Example 7>, except for using the titanium catalyst (t-3) obtained in Production Example 3 instead of the mixture (t-1). The [polyester resin p1-5] had a Tg of 45° C., an Mn of 2560, an Mw of 6200, and an acid value of 25.

Production Example 10

Synthesis of [Urethane Prepolymer 2 Having Polyester Resin (p1-6) as Constituent Unit]

To a pressure-resistant reaction vessel equipped with a stirring device and a dewatering device, 396 parts of 1,2-propylene glycol, 317 parts of terephthalic acid, 67 parts of adipic acid, 9 parts of trimellitic anhydride, and 0.25 parts of the mixture obtained in Production Example 1 (titanium catalyst) (t-1). Then, the whole was subjected to a dehydration reaction under pressure {0.3 MPa}, at 230° C. for 6 hours. Thereafter, the pressure was reduced slowly to normal pressure and simultaneously condensed water and excess 1,2-propylene glycol were distilled off. When the pressure in the system had reached normal pressure, 0.25 parts of the mixture (titanium catalyst) (t-1) was added, followed by a dehydration and dealcoholization reaction under a reduced pressure of 400 Pa for 6 hours. Thus, a [polyester resin p1-6] was obtained. The [polyester resin p1-6] had a Tg of 42° C., an Mn of 5200, an Mw of 21200, and an acid value of 0.8.

To an autoclave, 422 parts of the [polyester resin p1-6], 61 parts of IPDI and 517 parts of ethyl acetate were charged and then a reaction was performed in a hermetically-sealed state at 100° C. for 8 hours. Thus, a solution of a [urethane prepolymer 2] which had the polyester resin (p1-6) as a constituent unit and an isocyanate group at a molecular terminal was obtained. The NCO content of the [urethane prepolymer 2] solution was 0.8%.

Production Example 11

Synthesis of [Urethane Prepolymer 3 Having Polyester Resin (p1-7) as Constituent Unit]

A [polyester resin p1-7] was obtained in the same manner as in <Production Example 10>, except for using the mixture (titanium catalyst) (t-2) instead of the mixture (t-1). The [polyester resin p1-7] had a Tg of 43° C., an Mn of 5250, an Mw of 22400, and an acid value of 0.6. A solution of a [urethane prepolymer 3] having the polyester resin (p1-7) as a constituent unit and having an isocyanate group at a molecular terminal was obtained in the same manner as in <Production Example 10> except for using the [polyester resin p1-7] instead of the [polyester resin p1-6]. The NCO content of the [urethane prepolymer 3] solution was 0.7%.

Production Example 12

Synthesis of [Urethane Prepolymer 4 Having Polyester Resin (p1-8) as Constituent Unit]

A [polyester resin p1-8] was obtained in the same manner as in <Production Example 10>, except for using the titanium catalyst (t-3) instead of the mixture (t-1). The [polyester resin p1-8] had a Tg of 43° C., an Mn of 5280, an Mw of 22700, and an acid value of 1.1. A solution of a [urethane prepolymer 4] having the polyester resin (p1-8) as a constituent unit and having an isocyanate group at a molecular terminal was obtained in the same manner as in <Production Example 10> except for using the [polyester resin p1-8] instead of the [polyester resin p1-6]. The NCO content of the [urethane prepolymer 4] solution was 0.7%.

Production Example 13

Synthesis of [Vinyl Resin Solution]

To a reaction vessel equipped with a cooling tube, a stirrer, and a nitrogen inlet tube, 160 parts of ethyl acetate was charged and heated to 75° C. Then, a mixed solution of 40 parts of styrene, 120 parts of butyl methacrylate, 60 parts of acrylic acid, 60 parts of ethyl acetate and 0.3 parts of azobisisobutyronitrile was dropped over 4 hours. Thereafter, 0.5 parts of azobisisobutyronitrile was added and the mixture was matured at 75° C. for 8 hours to give a [resin solution 2] containing a [styrene-acrylic copolymer] having an Mn of 4200, a hydroxyl value of 0 and an acid value of 210 {copolymer concentration 50%}.

Production Example 14

Synthesis of [Curing Agent 1]

To a reaction vessel equipped with a stirrer, a solvent remover and a thermometer, 50 parts of isophoronediamine and 300 parts of methyl ethyl ketone were charged and a reaction was carried out at 50° C. for 5 hours. Then, the solvent was removed to give ketimine [curing agent 1]. The [curing agent 1] had an overall amine value of 415.

Production Example 15

Preparation of [Aqueous Dispersion Liquid W1] Containing [Resin Particle (A-1) Dispersion]

A reaction vessel fitted with a stirring rod and a thermometer was charged with 787 parts of polycaprolactonediol (Mn 2,000) and 800 parts of polyetherdiol (Mn 4,000, EO unit content 50%, PO unit content 50%, block form), and water was removed under a reduced pressure of 1300 Pa at 120° C. The water content after the removal of water was 0.05% {the water content was measured by the Karl Fischer method}. Then, 55.5 parts of HDI, 65.5 parts of hydrogenated MDI, and 0.6 parts of dibutyltin dilaurate were added and a reaction was carried out at 80° C. for 5 hours to give a [water-soluble polymer T1]. Then, 100 parts of the [resin particle (A-1) dispersion], 1 part of the [water-soluble polymer T1], and 107 parts of water were mixed and stirred to give a milk-white liquid [aqueous dispersion liquid W1].

Production Example 16

Preparation of [Aqueous Dispersion Liquid W2] Containing [Resin Particle (A-2) Dispersion]

Mixed and stirred were 784 parts of water, 136 parts of the [resin particle (A-2) dispersion], 2 pars of carboxymethyl cellulose ("CMC DAICEL 1170" produced by Daicel Chemical Industries, Ltd.) and 80 parts of a 48.5% aqueous solution of sodium dodecyl diphenyl ether disulfonate {sodium phenyl-dodecyl phenyl ether disulfonate} (Eleminol MON-7, produced by Sanyo Chemical Industries) to give a milk-white liquid [aqueous dispersion liquid W2].

Production Example 17

Preparation of [Aqueous Dispersion Liquid W3] Containing [Resin Particle (A-3) Dispersion]

Mixed and stirred were 634 parts of water, 286 parts of the [resin particle (A-3) dispersion], 2 pars of carboxymethyl cellulose ("CMC DAICEL 1170" produced by Daicel Chemical Industries, Ltd.) and 154 parts of a 48.5% aqueous solution of sodium dodecyl diphenyl ether disulfonate (Eleminol MON-7, produced by Sanyo Chemical Industries) to give a milk-white liquid [aqueous dispersion liquid W3].

Production Example 18

Synthesis of [Polyester Resin 1]

To a reaction vessel equipped with a stirring device and a dewatering device, 218 parts of a bisphenol A-EO (2 mol) adduct, 537 parts of a bisphenol A-PO (3 mol) adduct, 213 parts of terephthalic acid, 47 parts of adipic acid, and 1 part of dibutyltin oxide as a condensation catalyst were charged and then a dehydration reaction was performed at 230° C. under normal pressure for 5 hours. Then, a dehydration reaction was performed under a reduced pressure of 400 Pa at 230° C. for 5 hours. After cooling to 180° C., 43 parts of trimellitic anhydride was charged and a reaction was performed under normal pressure for 2 hours. Thus, a [polyester resin 1] was obtained. The [polyester resin 1] had a Tg of 45° C., an Mn of 2740, an Mw of 6550, and an acid value of 24.

Production Example 19

Synthesis of [Urethane Prepolymer 5]

To a reaction vessel equipped with a stirring device and a dewatering device, 681 parts of a bisphenol A-EO (2 mol) adduct, 81 parts of a bisphenol A-PO (2 mol) adduct, 275 parts of terephthalic acid, 7 parts of adipic acid, 22 parts of trimellitic anhydride, and 1 part of dibutyltin oxide as a condensation catalyst were added and then a dehydration reaction was performed under normal pressure at 230° C. for 5 hours. Then, a dehydration reaction was performed at 230° C. under a reduced pressure of 400 Pa for 5 hours. Thus, a [polyester resin 2] was obtained. The [polyester resin 2] had a Tg of 55° C., an Mn of 2260, an Mw of 9470, an acid value of 0.6, and a hydroxyl value of 54.

To an autoclave, 407 parts of the [polyester resin 2], 54 parts of IPDI and 485 parts of ethyl acetate were charged and then a reaction was performed in a hermetically-sealed state at 100° C. for 5 hours. Thus, a solution of a [urethane prepolymer 5] having an isocyanate group at a molecular terminal was obtained. The NCO content of the [urethane prepolymer 5] solution was 1.0%.

Example 1

In a beaker, 177 parts of the [polyester resin p1-3], 181 parts of ethyl acetate, 39.2 parts of the [urethane prepolymer 1] solution, and 0.9 parts of the [curing agent 1] were charged. The mixture was dissolved and mixed to homogenize, thereby giving a [resin solution 3]. Into the [resin solution 3], 600 parts of the [aqueous dispersion liquid W1] was added and the mixture was subjected to dispersion operation at a rotation speed of 12000 rpm at 25° C. for 1 minute using a TK Homomixer (manufactured by Tokushu Kika Kogyo Co., Ltd.). Then, the solvent was removed over 240 minutes using a film evaporator at a pressure reduction degree of −0.05 MPa (gauge pressure), a temperature of 40° C., and a rotation speed of 100 rpm to give an aqueous dispersion (X1-1). 100 parts of the aqueous dispersion (X1-1) was subjected to centrifugal separation, followed by repeating twice a step of solid-liquid separation including addition of 60 parts of water and subsequent centrifugal separation. Then, the mixture was dried at 35° C. for 1 hour to give resin particles (C1). Further, 20 parts of MEK oxime-blocked HDI was added to 100 parts of the resin particles (C1) and the mixture was mixed with a Henschel mixer for 30 minutes to give a coating composition (CP1).

Example 2

An aqueous dispersion (X1-2), resin particles (C2) and a coating composition (CP2) were obtained in the same method as in the above-described <Example 1> except for using the [aqueous dispersion liquid W2] instead of the [aqueous dispersion liquid W1].

Example 3

An aqueous dispersion (X1-3), resin particles (C3) and a coating composition (CP3) were obtained in the same method as in <Example 1> except for using an [aqueous dispersion liquid W3] instead of the [aqueous dispersion liquid W1].

Example 4

An aqueous dispersion (X1-4), resin particles (C4) and a coating composition (CP4) were obtained in the same method as in <Example 1> except for using a [urethane prepolymer 2] solution instead of the [urethane prepolymer 1] solution and using the [aqueous dispersion liquid W2] instead of the [aqueous dispersion liquid W1].

Example 5

An aqueous dispersion (X1-5), resin particles (C5) and a coating composition (CP5) were obtained in the same method as in <Example 1> except for using a [polyester resin p1-4] instead of the [polyester resin p1-3], using a [urethane prepolymer 3] solution instead of the [urethane prepolymer 1] solution and using the [aqueous dispersion liquid W2] instead of the [aqueous dispersion liquid W1].

Example 6

An aqueous dispersion (X1-6), resin particles (C6) and a coating composition (CP6) were obtained in the same method as in <Example 1> except for using a [polyester resin p1-5] instead of the [polyester resin p1-3], using a [urethane prepolyester 4] solution instead of the [urethane prepolyester 1] solution, and using the [aqueous dispersion liquid W2] instead of the [aqueous dispersion liquid W1].

Example 7

An aqueous dispersion (X1-7), resin particles (C7) and a coating composition (CP7) were obtained in the same method as in <Example 1> except for using 358 parts of a [resin solution 2] containing the [styrene-acrylic copolymer] prepared in Production Example 13 instead of 177 parts of the [polyester resin p1-3] and 181 parts of the ethyl acetate and using the [aqueous dispersion liquid W2] instead of the [aqueous dispersion liquid W1].

Example 8

An aqueous dispersion (X1-8), resin particles (C8) and a coating composition (CP8) were obtained in the same method as in <Example 1> except for using 397 parts of a [urethane prepolymer 2] solution instead of 177 parts of the [polyester resin p1-3], 181 parts of the ethyl acetate and 39.2 parts of the [urethane prepolymer 1] solution, and using the [aqueous dispersion liquid W2] instead of the [aqueous dispersion liquid W1].

Example 9

An aqueous dispersion (X1-9), resin particles (C9) and a coating composition (CP9) were obtained in the same method as in <Example 1> except for using a [polyester resin 1] instead of the [polyester resin p1-3], using a [urethane prepolymer 5] instead of the [urethane prepolymer 1], and using the [aqueous dispersion liquid W3] instead of the [aqueous dispersion liquid W1].

Example 10

To 100 parts of the aqueous dispersion (X1-2) obtained in <Example 2> was added 100 parts of a 5% aqueous solution of sodium hydroxide, and using a TK Homomixer (manufactured by Tokushu Kika) set to 40° C., the mixture was agitated at a rotation speed of 12,000 rpm for 10 minutes to dissolve out the resin particles (A-2) adhering to the surface of the resin particles (C2). The slurry was then centrifuged to remove the supernatant and, after addition of 100 parts of water, recentrifuged. This procedure was repeated twice, followed by drying at 35° C. for 1 hour to give resin particles (B2). Further, 20 parts of MEK oxime-blocked HDI was added to 100 parts of the resin particles (B2) and the mixture was stirred with a Henschel mixer for 30 minutes to give a coating composition (BP2).

Example 11

Resin particles (B4) and a coating composition (BP4) were obtained by the same operation as <Example 10>, except for using the aqueous dispersion (X1-4) obtained in <Example 4> instead of the aqueous dispersion (X1-2).

Example 12

Resin particles (B7) and a coating composition (BP7) were obtained by the same operation as <Example 10>, except for using the aqueous dispersion (X1-7) obtained in <Example 7> instead of the aqueous dispersion (X1-2).

Comparative Example 1

In a beaker, 177 parts of the [polyester resin 1], 181 parts of ethyl acetate, 39.2 parts of the [urethane prepolymer 5] solution, and 0.9 parts of the [curing agent 1] were charged. The mixture was dissolved and mixed to homogenize, thereby giving a [resin solution 4]. Into the [resin solution 4], 600 parts of the [aqueous dispersion liquid W1] was added and the mixture was subjected to dispersion operation at a rotation speed of 12000 rpm at 25° C. for 1 minute using a TK Homomixer (manufactured by Tokushu Kika Kogyo Co., Ltd.). Then, the solvent was removed over 240 minutes using a film evaporator at a pressure reduction degree of −0.05 MPa (gauge pressure), a temperature of 40° C., and a rotation speed of 100 rpm to give a comparative aqueous dispersion (HX1-1). 100 parts of the aqueous dispersion (HX1-1) was subjected to centrifugal separation, followed by repeating twice a step of solid-liquid separation including addition of 60 parts of water and subsequent centrifugal separation. Then, the mixture was dried at 35° C. for 1 hour to give comparative resin particles (HC1). Further, 20 parts of MEK oxime-blocked HDI was added to 100 parts of the resin particles (HC1) and the mixture was stirred with a Henschel mixer for 30 minutes to give a comparative coating composition (HCP1).

Comparative Example 2

A comparative aqueous dispersion (HX1-2), resin particles (HC2) and a coating composition (HCP2) were obtained in the same method as in <Comparative Example 1> except for using the [aqueous dispersion liquid W2] instead of the [aqueous dispersion liquid W1].

Comparative Example 3

A comparative aqueous resin dispersion (HX1-3), resin particles (HC3) and a coating composition (HCP3) were obtained in the same method as in <Comparative Example 1> except for using 358 parts of the [resin solution 2] containing a [styrene-acrylic copolymer] instead of 177 parts of the [polyester resin 1] and 181 parts of ethyl acetate.

Comparative Example 4

Comparative resin particles (HB2) and a coating composition (HBP2) were obtained by the same operation as <Example 10>, except for using the comparative aqueous resin dispersion (HX1-2) instead of the aqueous dispersion (X1-2).

<Physical Property Measurement Example 1>

As to the resin particles (C1) to (C9), resin particles (B2), (B4), and (B7) obtained in Examples 1 to 12, and comparative resin particles (HC1) to (HC3) and (HB2) obtained in Comparative Examples 1 to 4, the volume average particle diameter and the particle size distribution (volume average particle diameter/number average particle diameter), the surface coverage, the BET specific surface area, the surface average centerline roughness, and the circularity (Wadell practical sphericity) were measured and the results are shown in Tables 1 and 2.

Furthermore, in order to examine the heat-resistant preservability of each resin particles, the presence or absence of fusion of particles was checked after preservation for 7 days in an atmosphere at 40° C. In the check of fusion, 50 g of each preserved resin particles were sifted through a standard sieve with 150-μm openings for 15 minutes and then the amount of resin particles remaining on the sieve was measured. Judgment was made on the basis of the proportion of the amount and the results are shown in Tables 1 and 2.

∘∘: Aggregation less than 0.2%

∘: Aggregation 0.2% to less than 1.0%

Δ: Aggregation 1.0% to less than 2.0% x: Aggregation 2.0% or more

Moreover, each of the coating compositions (CP1) to (CP9), (BP2), (BP4), (BP7), (HCP1) to (HCP3) and (HBP2) prepared above was coated electrostatically to a thickness of 40 to 60 μm using a commercial corona charge spray gun onto a zinc phosphate-treated steel standard plate produced by NIPPON TEST PANEL, baked at 180° C. for 20 minutes, and then subjected to a shear adhesion test in accordance with the method prescribed in JIS K6830-1996. The results are shown in Tables 1 and 2. The adhesion (adhesiveness) was evaluated on the basis of the criteria shown below.

∘: Complete cohesion failure

Δ: Trace destruction with partial interfacial failure x: Complete interfacial failure A coating composition was electrostatically coated and baked similarly to the adhesiveness evaluation described above and then immersed in warm water at 40° C. for 10 days. Then, the shear adhesion test (water-resistant adhesiveness) was conducted in accordance with the method prescribed in JIS K6830-1996. The results are shown in Tables 1 and 2. The evaluation criteria used were the same as those for the adhesion (adhesiveness) described above.

TABLE 1

| | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Resin particle | C1 | C2 | C3 | C4 | C5 | C6 | C7 | C8 | C9 | B2 | B4 | B7 |
| Volume average particle diameter (μm) | 9.8 | 9.5 | 6.2 | 6.8 | 6.5 | 6.4 | 10.4 | 7.2 | 6.5 | 9.3 | 6.3 | 10.0 |
| Volume average particle diameter/Number average particle diameter | 1.13 | 1.13 | 1.14 | 1.16 | 1.15 | 1.14 | 1.05 | 1.15 | 1.13 | 1.13 | 1.11 | 1.05 |
| Surface coverage (%) | 88 | 95 | 92 | 96 | 93 | 95 | 85 | 80 | 93 | 1 or less | 1 or less | 1 or less |
| BET specific surface area (m²/g) | 1.2 | 4.5 | 5.8 | 5.9 | 5.1 | 4.6 | 4.1 | 1.5 | 2.2 | 3.0 | 5.2 | 3.3 |
| Surface average centerline roughness (μm) | 0.61 | 0.21 | 0.24 | 0.18 | 0.22 | 0.27 | 0.11 | 0.58 | 0.32 | 0.15 | 0.23 | 0.12 |
| Circularity | 0.984 | 0.981 | 0.979 | 0.973 | 0.971 | 0.974 | 0.982 | 0.981 | 0.978 | 0.982 | 0.976 | 0.983 |
| Heat-resistant preservability | ⊚ | ⊚ | ⊚ | ⊚ | ⊚ | ○ | ⊚ | ⊚ | ⊚ | ○ | ⊚ | ○ |
| Adhesiveness | ○ | ○ | ○ | ○ | ○ | ○ | ○ | ○ | ○ | ○ | ○ | ○ |
| Water-resistant adhesiveness | ○ | ○ | ○ | ○ | ○ | ○ | Δ | ○ | Δ | ○ | ○ | Δ |

TABLE 2

| | Comparative Example | | | |
|---|---|---|---|---|
| | 1 | 2 | 3 | 4 |
| Resin particle | HC1 | HC2 | HC3 | HB2 |
| Volume average particle diameter (μm) | 11.2 | 9.9 | 9.1 | 9.7 |
| Volume average particle diameter/ Number average particle diameter | 1.15 | 1.18 | 1.17 | 1.16 |
| Surface coverage (%) | 91 | 89 | 90 | 1 or less |
| BET specific surface area (m²/g) | 0.8 | 3.2 | 5.5 | 4.6 |
| Surface average centerline roughness (μm) | 0.88 | 0.49 | 0.31 | 0.14 |
| Circularity | 0.980 | 0.985 | 0.984 | 0.980 |
| Heat-resistant preservability | x | x | Δ | x |
| Adhesiveness | Δ | Δ | x | x |
| Water-resistant adhesiveness | x | x | x | x |

INDUSTRIAL APPLICABILITY

As to an aqueous dispersion and resin particles obtained by the production method of the present invention, it is possible to stably produce high performance resin particles capable of exhibiting good adhesiveness to an object (metal, paper, wood, or the like) even in use for applications involving thermally melting the resin particles to make them adhered to the object firmly. Therefore, a resin dispersion and resin particles obtained by the production method of the present invention are extremely useful as particles useful for a resin for slush molding, a powder coating, a spacer for the manufacture of electronic components (liquid crystal, and the like), standard particles for electronic measuring instruments, base particles for an electron photographic toner, base particles for an electrostatic recording toner, base particles for an electrostatic printing toner, various types of hot melt adhesives, and other molding materials.

The invention claimed is:

1. A method for producing an aqueous dispersion (X1), the method comprising;

providing an aqueous dispersion liquid (W) of resin particles (A) comprising a resin (a), wherein the resin (a) is an epoxy resin, a vinyl resin, or a polyester resin (p1);

providing a precursor (b0) of a resin (b), or an oily liquid (OL) comprising the precursor (b0) and an organic solvent, wherein the resin (b) comprises the polyester resin (p1) or a polyurethane resin (p2) having the polyester resin (p1) as constituent unit;

mixing the aqueous dispersion liquid (W) with the precursor (b0) or the oily liquid (OL) to disperse the precursor (b0) in the aqueous dispersion liquid (W);

causing the precursor (b0) to react in the aqueous dispersion liquid (W) to form resin particles (B) comprising the resin (b); and obtaining the aqueous dispersion (X1) of resin particles (C) having a structure where the resin particles (A) are adhered on the surface of the resin particles (B), wherein the polyester resin (p1) has been formed in the presence of a titanium catalyst (t) represented by the following general formula (I):

$$Ti(-X)_m(-OR)_n \quad (I)$$

wherein R represents a hydrogen atom, ethyl, n-propyl, isopropyl, n-butyl or n-hexyl, Ti represents a titanium atom, O represents an oxygen atom, and X represents a residue formed by removal of a hydrogen atom of one carboxyl group from benzoic acids or phthalic acids atoms, wherein X may react with OR groups in the same molecule intramolcularly to form a cyclic structure or react with OR groups of other molecules intermolecularly to form a structure having 2 to 5 titanium atoms, m=1 to 3, n =1 to 3, and the sum of m and n is 4.

2. The method according to claim 1, wherein the solubility of the titanium catalyst (t) to water at 30° C. is [5 g/100 ml] or less.

3. The method according to claim 1, wherein 80% or more of the ester bonds of the polyester resin (p1) are formed by dehydration condensation.

4. The method according to claim 1, wherein the resin (b) further comprises vinyl resins.

5. The method according to claim 1, wherein the precursor (b0) comprises a reactive group-containing prepolymer (α) having the polyester resin (p1) as a constituent unit and a curing agent (β).

6. The method according to claim 1, wherein the titanium catalyst (t) is titanium dihydroxydibenzenecarboxylate.

7. A method for producing an aqueous dispersion (X2), the method comprising a step that comprises detaching adhered resin particles (A) from resin particles (B) in an aqueous dispersion (X1) obtained by the production method according to claim 1, followed by separating and removing the resin particles (A) from the aqueous dispersion to obtain the aqueous dispersion (X2) of the resin particles (B), or a step that comprises dissolving the resin particles (A) in the aquous dispersion (X1) to separate and remove the resin particles (A), thereby obtaining the aqueous dispersion (X2) of the resin particles (B).

8. The method according to claim 7, wherein the [volume average particle diameter/number average particle diameter] of the resin particles (B) is 1.0 to 1.5.

9. A method for producing resin particles, the method comprising a step that comprises removing an aqueous solvent from an aqueous dispersion (X1) obtained by the production method according to claim 1 to obtain resin particles (C).

10. A method for producing resin particles, the method comprising a step that comprises removing an aqueous solvent from an aqueous dispersion (X2) obtained by the production method according to claim 7 to obtain resin particles (B).

11. Resin particles obtained by the production method according to claim 9.

12. Resin particles obtained by the production method according to claim 10.

13. Resin particles which are resin particles (C) having a structure where resin particles (A) comprising a resin (a) are adhered on the surface of resin particles (B) comprising a resin (b), wherein

[1] the [volume average particle diameter of resin particles (A)/volume average particle diameter of resin particles (C)] is 0.001 to 0.3,

[2] the volume average particle diameter of the resin particles (A) is 0.0005 to 30 μm and the volume average particle diameter of the resin particles (C) is 0.1 to 300 μm,

[3] 5% or more of the surface of the resin particle (B) is covered with the resin particle (A),

[4] the [volume average particle diameter/number average particle diameter] of the resin particles (C) is 1.0 to 1.5,

[5] the resin (a) is an epoxy resin, a vinyl resin, or a polyester resin (p1), and the resin (b) comprises the polyester resin (p1) or a polyurethane resin (p2) having the polyester resin (p1) as constituent unit, wherein the polyester resin (p1) has been formed in the presence of a titanium catalyst represented by the following general formula (I) and the resin (b), as needed, further comprises vinyl resins:

$$Ti(-X)_m(-OR)_n \quad (I)$$

wherein R represents a hydrogen atom, ethyl, n-propyl, isopropyl, n-butyl or n-hexyl, Ti represents a titanium atom, O represents an oxygen atom, and X represents a residue formed by removal of a hydrogen atom of one carboxyl group from benzoic acids or phthalic acids, atoms, wherein X may react with OR groups in the same molecule intramolcularly to form a cyclic structure or react with OR groups of other molecules intermolecularly to form a structure having 2 to 5 titanium atoms, m=1 to 3, n=1 to 3, and the sum of m and n is 4.

14. The resin particles according to claim 13, wherein the titanium catalyst (t) is titanium dihydroxydibenzenecarboxylate.

15. Resin particles which are resin particles (B) comprising a resin (b) which comprises a polyester resin (p1) formed in the presence of a titanium catalyst (t) represented by the following general formula (I) or a polyurethane resin (p2) having the polyester resin (p1) as a constituent unit and, as needed, which further comprises vinyl resins, wherein

[1] the [volume average particle diameter/number average particle diameter] of the resin particles (B) is 1.0 to 1.5,

[2] the volume average particle diameter of the resin particles (B) is 0.1 to 300 μm, $$Ti(-X)_m(-OR)_n \quad (I)$$

wherein R represents a hydrogen atom, ethyl, n-propyl, isopropyl, n-butyl or n-hexyl, Ti represents a titanium atom, O represents an oxygen atom, and X represents a residue formed by removal of a hydrogen atom of one carboxyl group from benzoic acids or phthalic acids, atoms, wherein X may react with OR groups in the same molecule intramolcularly to form a cyclic structure or react with OR groups of other molecules intermolecularly to form a structure having 2 to 5 titanium atoms, m=1 to 3, n=1 to 3, and the sum of m and n is 4.

16. The resin particles according to claim 15, wherein the titanium catalyst (t) is titanium dihydroxydibenzenecarboxylate.

17. The resin particles according to claim 11, for use as a resin for slush molding, a powder coating, a spacer for the manufacture of electronic components, standard particles for electronic measuring instruments, base particles for an electron photographic toner, base particles for an electrostatic recording toner, base particles for an electrostatic printing toner or a hot melt adhesive.

18. The resin particles according to claim 12, for use as a resin for slush molding, a powder coating, a spacer for the manufacture of electronic components, standard particles for electronic measuring instruments, base particles for an electron photographic toner, base particles for an electrostatic recording toner, base particles for an electrostatic printing toner or a hot melt adhesive.

19. The resin particles according to claim 13, for use as a resin for slush molding, a powder coating, a spacer for the manufacture of electronic components, standard particles for electronic measuring instruments, base particles for an electron photographic toner, base particles for an electrostatic recording toner, base particles for an electrostatic printing toner or a hot melt adhesive.

20. The resin particles according to claim 15, for use as a resin for slush molding, a powder coating, a spacer for the manufacture of electronic components, standard particles for electronic measuring instruments, base particles for an electron photographic toner, base particles for an electrostatic recording toner, base particles for an electrostatic printing toner or a hot melt adhesive.

* * * * *